US012699282B2

(12) United States Patent
Boinnard et al.

(10) Patent No.: US 12,699,282 B2
(45) Date of Patent: Aug. 4, 2026

(54) AERODYNAMIC EYEWEAR

(71) Applicant: 100% Speedlab, LLC, San Diego, CA (US)

(72) Inventors: Ludovic Francis Boinnard, San Diego, CA (US); Marc Guy Blanchard, Solana Beach, CA (US); Jerome Jacques Marie Mage, San Diego, CA (US); Jamie Oman, Capitola, CA (US)

(73) Assignee: 100% Speedlab, LLC, San Diego, CA (US)

( * ) Notice: Subject to any disclaimer, the term of this patent is extended or adjusted under 35 U.S.C. 154(b) by 319 days.

(21) Appl. No.: 18/579,470

(22) PCT Filed: Jul. 15, 2022

(86) PCT No.: PCT/US2022/037395
§ 371 (c)(1),
(2) Date: Jan. 15, 2024

(87) PCT Pub. No.: WO2023/288113
PCT Pub. Date: Jan. 19, 2023

(65) Prior Publication Data
US 2024/0329426 A1 Oct. 3, 2024

Related U.S. Application Data

(60) Provisional application No. 63/222,384, filed on Jul. 15, 2021.

(51) Int. Cl.
*G02C 7/02* (2006.01)
*G02C 1/02* (2006.01)
(Continued)

(52) U.S. Cl.
CPC ................. *G02C 7/02* (2013.01); *G02C 1/02* (2013.01); *G02C 5/10* (2013.01); *G02C 5/12* (2013.01);
(Continued)

(58) Field of Classification Search
USPC ....... 351/41, 116, 121, 138; 2/426, 448–451
See application file for complete search history.

(56) References Cited

U.S. PATENT DOCUMENTS 4,425,669 A * 1/1984 Grendol ................. A61F 9/028
2/436
4,964,714 A * 10/1990 Weymouth, Jr. ........ A61F 9/025
351/111
(Continued)

FOREIGN PATENT DOCUMENTS

EP 3370106 A1 9/2018
FR 2697921 A1 5/1994

OTHER PUBLICATIONS

International Search Report and Written Opinion of the International Searching Authority from the European Patent Office, in PCT/US2022/037395 dated Oct. 25, 2022, which is an international application to which this application claims priority.

*Primary Examiner* — Darryl J Collins
(74) *Attorney, Agent, or Firm* — Kolitch Romano Dascenzo Gates LLP

(57) ABSTRACT

An article of eyewear may include a frameless, rigid lens configured to cover both eyes of a wearer when worn. The lens has a generally cylindrical curvature in a side-to-side direction, such that lateral ends of the lens are rearward of a central nose bridge. A pair of temples are attached to the lens, each temple including a mounting portion configured to releasably mate with the lens and a temple arm pivotably coupled to the mounting portion. In some examples, a vertical cross section taken at the nose bridge of the lens has
(Continued)

an S-shaped profile, and a vertical cross section taken in an area between the nose bridge and a lateral end of the lens has a C-shaped profile.

20 Claims, 23 Drawing Sheets

(51) Int. Cl.
| | | |
|---|---|---|
| *G02C 5/10* | (2006.01) | |
| *G02C 5/12* | (2006.01) | |
| *G02C 5/14* | (2006.01) | |
| *G02C 7/14* | (2006.01) | |

(52) U.S. Cl.
CPC ............... *G02C 5/126* (2013.01); *G02C 7/14* (2013.01); *G02C 2200/08* (2013.01)

(56) References Cited

U.S. PATENT DOCUMENTS

| | | | | |
|---|---|---|---|---|
| 4,998,815 | A * | 3/1991 | Lin ........................... | G02C 5/10 351/149 |
| 5,000,558 | A * | 3/1991 | Blackstone ............ | G02C 5/126 351/111 |
| 5,357,292 | A * | 10/1994 | Wiedner .............. | G02C 5/2263 351/115 |
| 5,387,949 | A * | 2/1995 | Tackles .................... | G02C 5/10 351/110 |
| 5,539,561 | A * | 7/1996 | Khalifa .................... | G02C 1/02 351/116 |
| 6,742,891 | B2 * | 6/2004 | Chen ........................ | G02C 1/02 351/140 |
| 6,976,756 | B1 | 12/2005 | Chen | |
| 7,458,680 | B1 | 12/2008 | Cheng | |
| 7,484,843 | B1 * | 2/2009 | Lin ........................ | G02C 5/126 351/80 |
| 9,709,818 | B1 | 7/2017 | Chen | |
| 2004/0046929 | A1 * | 3/2004 | Wu .......................... | G02C 5/02 351/134 |
| 2004/0141146 | A1 * | 7/2004 | Blanchette ............ | G02C 5/146 351/41 |
| 2004/0156009 | A1 * | 8/2004 | Yeh .......................... | G02C 1/04 351/41 |
| 2005/0270476 | A1 * | 12/2005 | Curci ...................... | G02C 5/04 351/109 |
| 2009/0122257 | A1 | 5/2009 | Huang | |
| 2011/0261313 | A1 * | 10/2011 | Seeto ...................... | A61F 9/029 351/41 |
| 2015/0074880 | A1 | 3/2015 | Blanchard et al. | |
| 2017/0023795 | A1 | 1/2017 | Chen | |
| 2020/0341294 | A1 | 10/2020 | Cheng et al. | |

* cited by examiner

102

AERODYNAMIC EYEWEAR

CROSS-REFERENCES

The following applications and materials are incorporated herein, in their entireties, for all purposes: U.S. Provisional Patent Application Ser. No. 63/222,384, filed Jul. 15, 2021.

FIELD

This disclosure relates to systems and methods for eyewear. More specifically, the disclosed embodiments relate to aerodynamic eyewear having replaceable temples.

SUMMARY

The present disclosure provides systems, apparatuses, and methods relating to aerodynamic eyewear.

In some examples, an article of eyewear includes: a frameless, rigid lens configured to cover both eyes of a wearer when worn, the lens having a generally cylindrical curvature in a side-to-side direction, such that lateral ends of the lens are rearward of a central nose bridge; and a pair of temples, each temple including a mounting portion configured to releasably mate with the lens and a temple arm pivotably coupled to the mounting portion.

In some examples, an article of eyewear includes: a rigid lens configured to cover both eyes of a wearer when worn, the lens having a central nose bridge and a permanent curvature from side to side; the lens including a main body, a top fairing extending rearward from an upper edge of the main body, and a lower flange extending rearward from a lower edge of the main body; and a pair of temples, each temple including a mounting portion configured to releasably mate with the lens and a temple arm pivotably coupled to the mounting portion; wherein a first vertical cross section taken at the nose bridge of the lens has a generally rectilinear S-shaped profile, and a second vertical cross section taken in an area between the nose bridge and a lateral end of the lens has a generally rectilinear C-shaped profile.

In some examples, a method for replacing temples of an article of eyewear includes: urging a first temple having a first mounting portion fixed to a lens and a first arm pivotably coupled to the first mounting portion, such that the first mounting portion rotates relative to the lens and releases a hook of the lens from an engagement surface of the first mounting portion; disengaging the first temple from the lens; engaging a second temple with the lens, wherein the second temple includes a second mounting portion and a second arm, by inserting the hook of the lens into an opening of the second mounting portion; and urging the second mounting portion until the hook of the lens snaps into place relative to the engagement surface of the second mounting portion.

Features, functions, and advantages may be achieved independently in various embodiments of the present disclosure, or may be combined in yet other embodiments, further details of which can be seen with reference to the following description and drawings.

DETAILED DESCRIPTION

Figure 1:
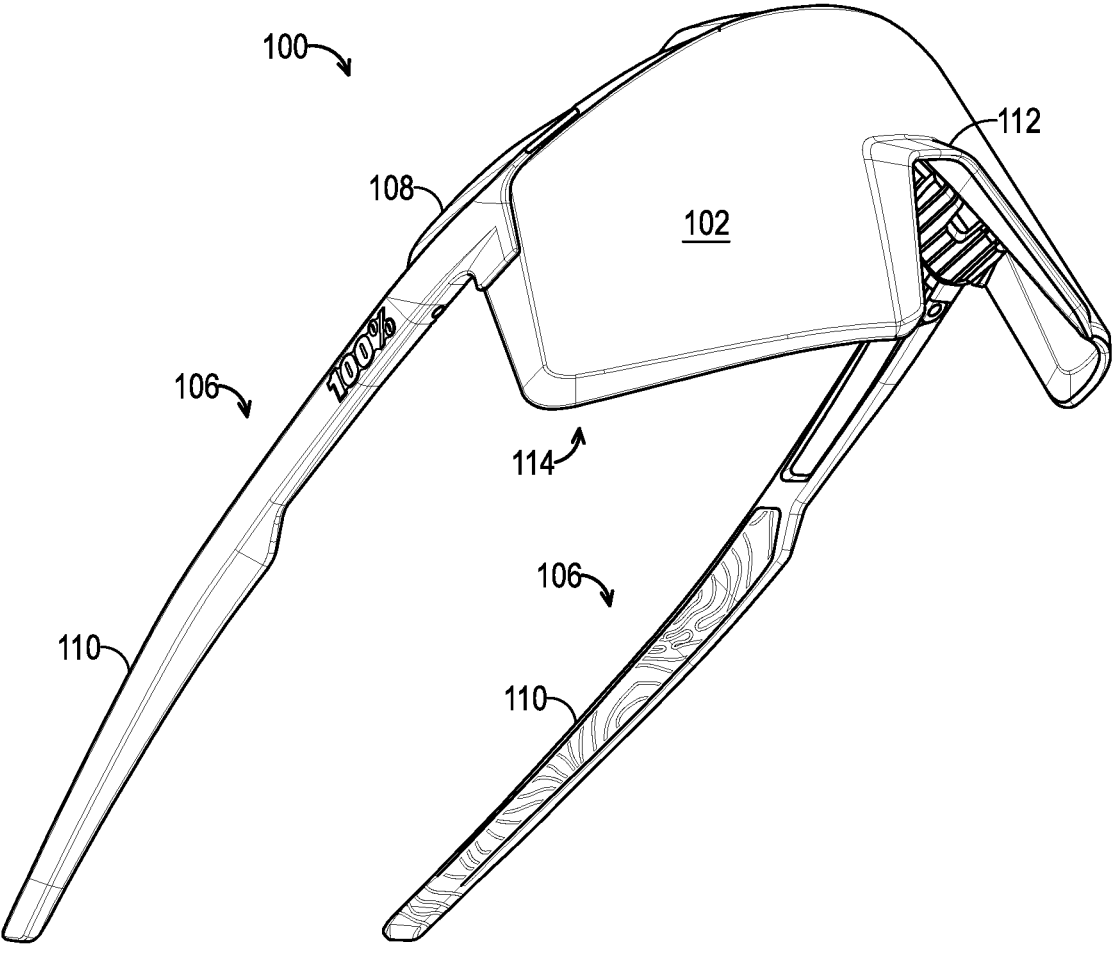
FIG. 1 is an isometric view of an illustrative article of eyewear in accordance with aspects of the present disclosure.
Figures 2, 3:
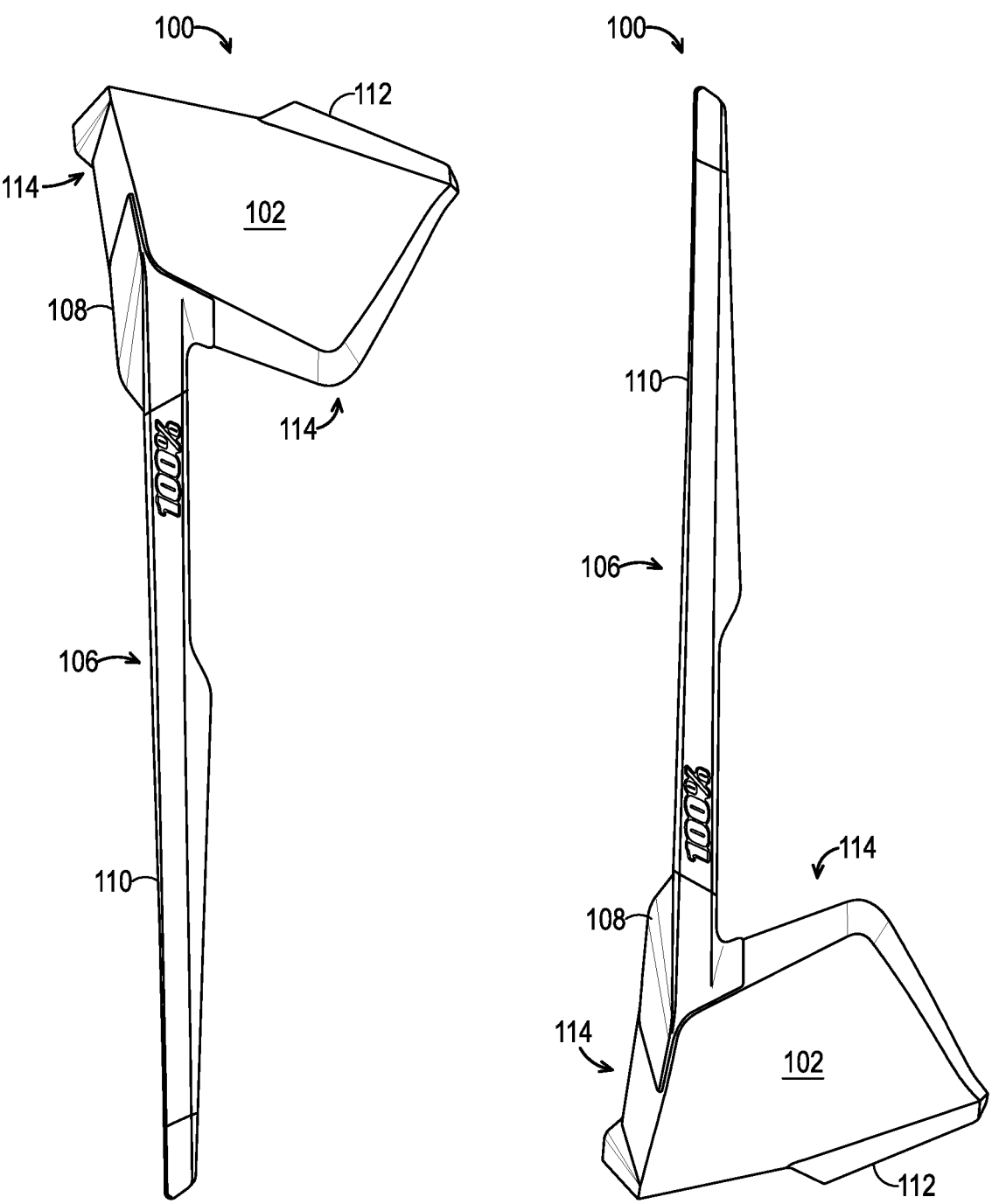
FIG. 2 is a first side view of the article of eyewear of FIG. 1.
FIG. 3 is a second side view of the article of eyewear of FIG. 1.
Figure 4:
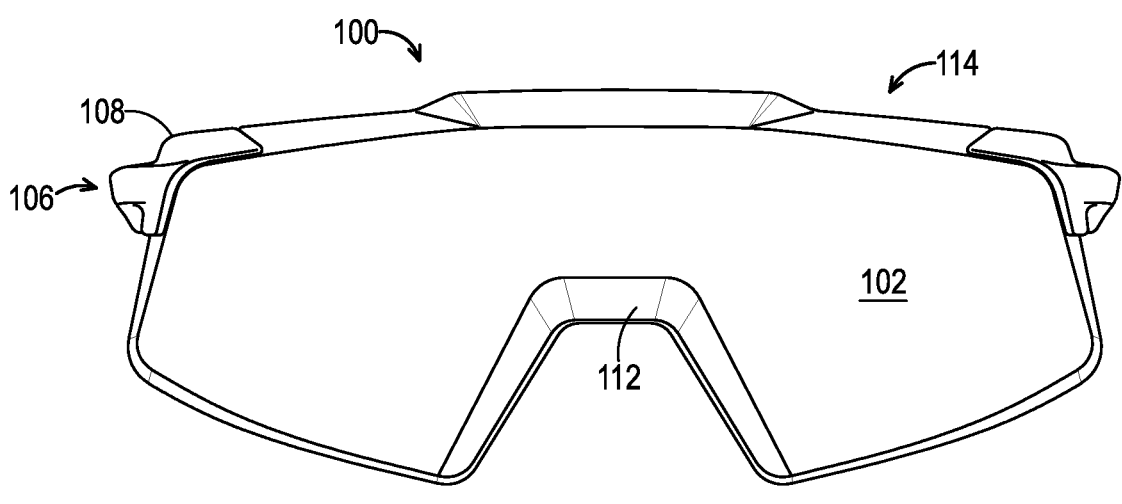
FIG. 4 is a front elevation view of the article of eyewear of FIG. 1.
Figure 5:
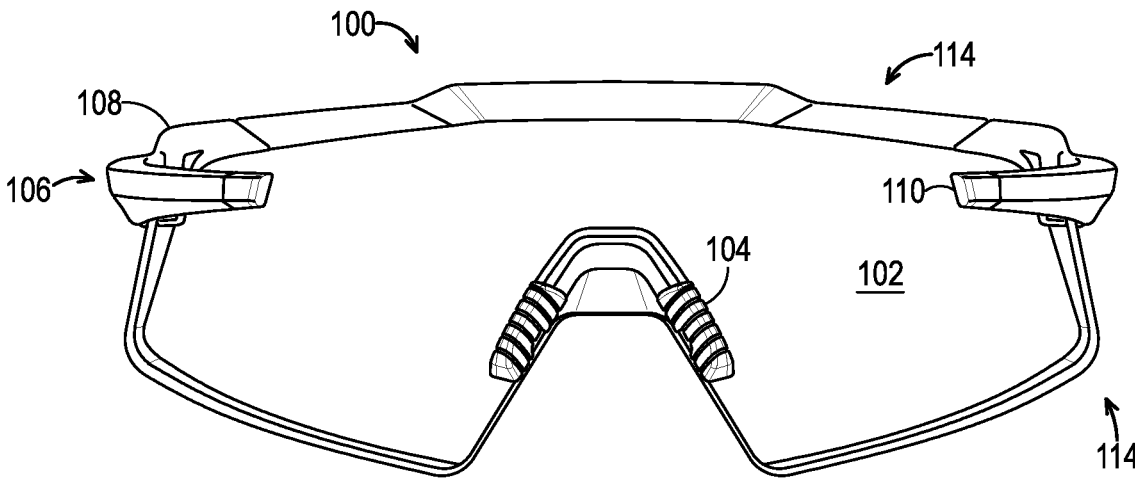
FIG. 5 is a rear elevation view of the article of eyewear of FIG. 1.
Figure 6:
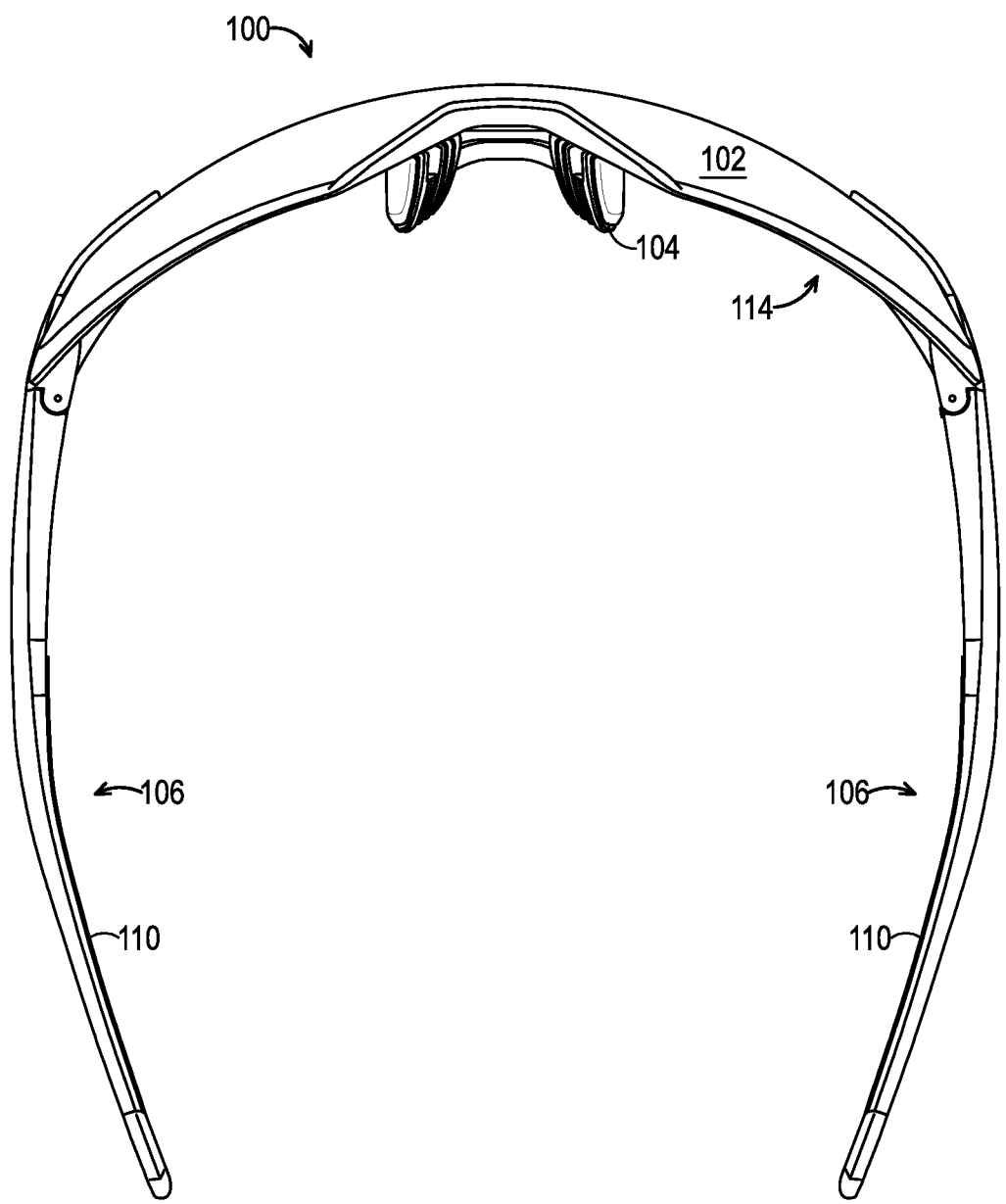
FIG. 6 is a bottom plan view of the article of eyewear of FIG. 1.
Figure 7:
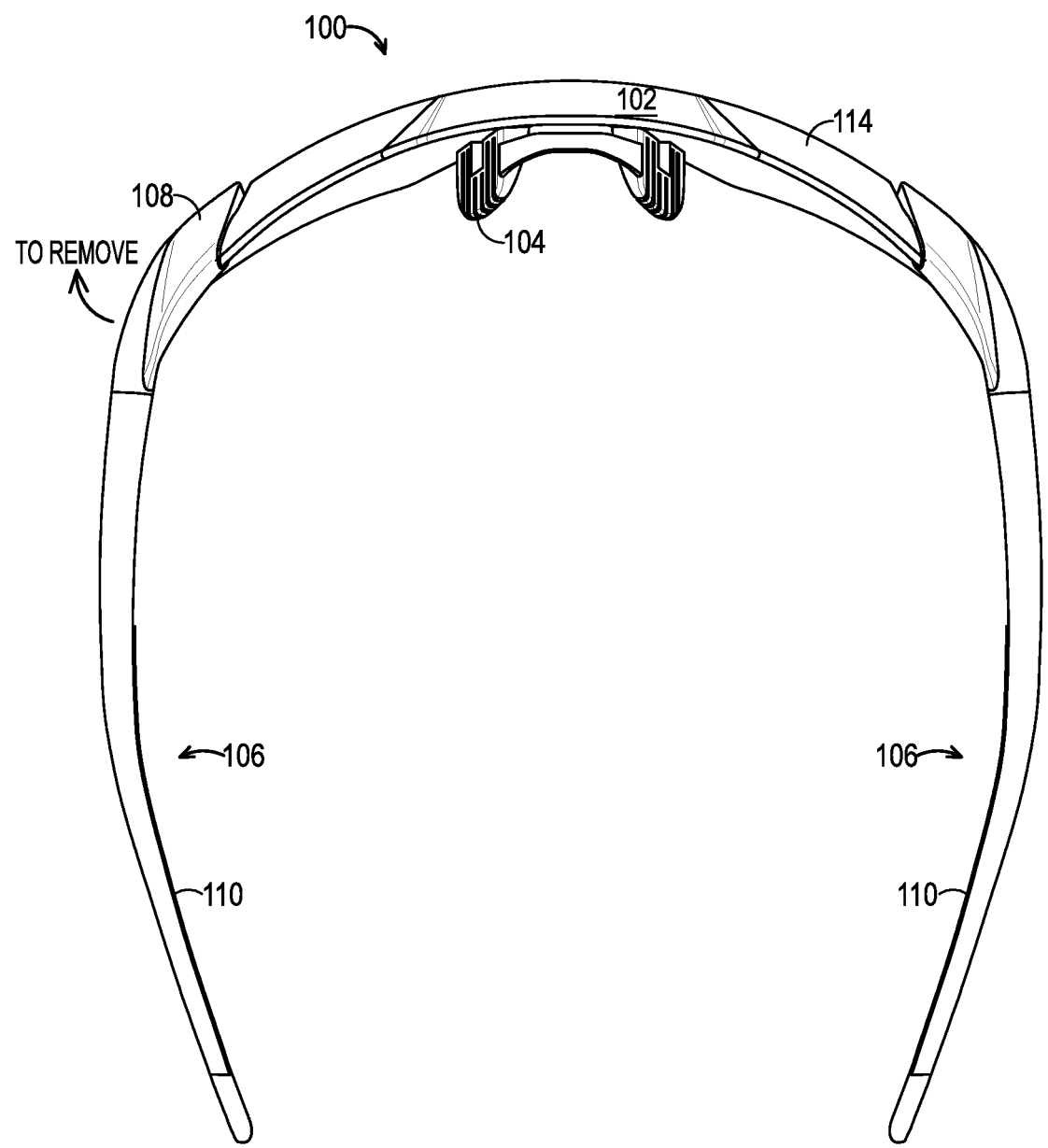
FIG. 7 is a top plan view of the article of eyewear of FIG. 1.
Figure 8:
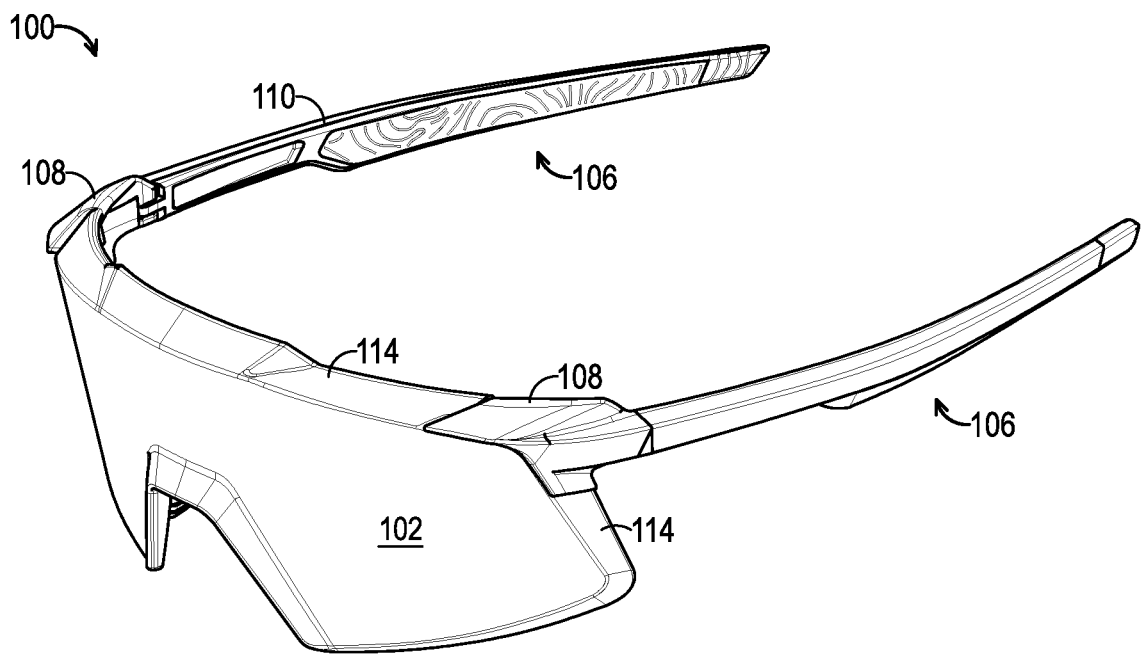
FIGS. 8 and 9 are further isometric views of the article of eyewear of FIG. 1.
Figure 9:
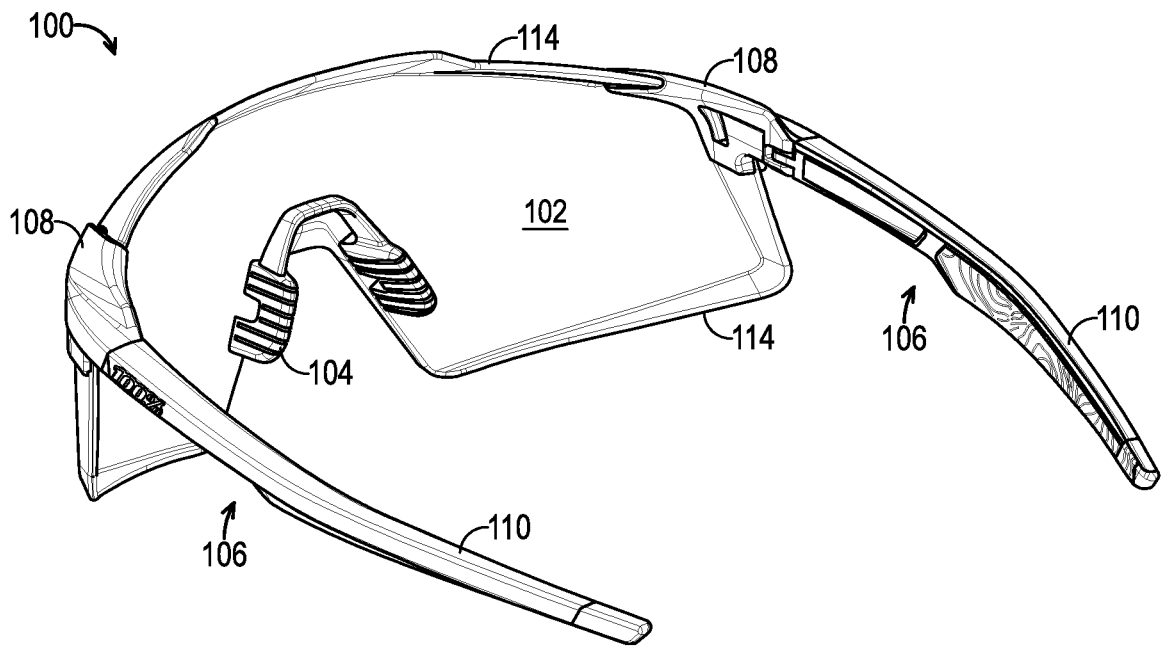
Figure 10:
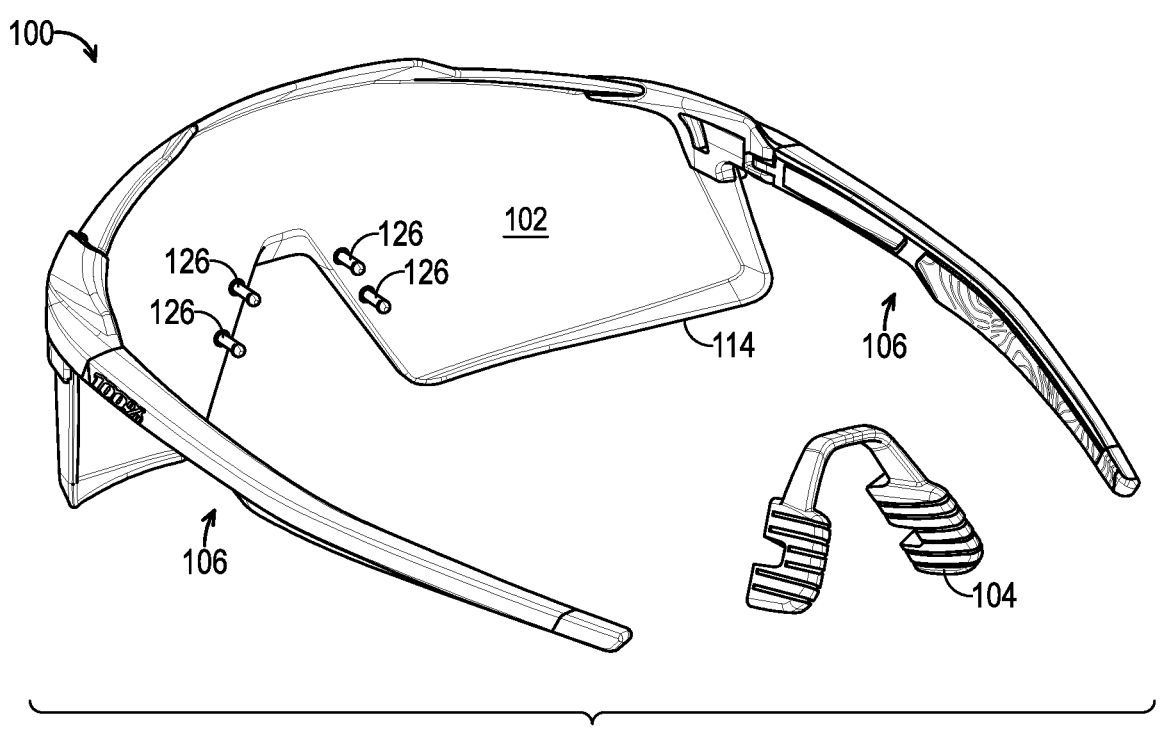
FIG. 10 is a rear oblique view of the article of eyewear of FIG. 1, with a nose pad removed to expose underlying mounting pegs.
Figure 11:
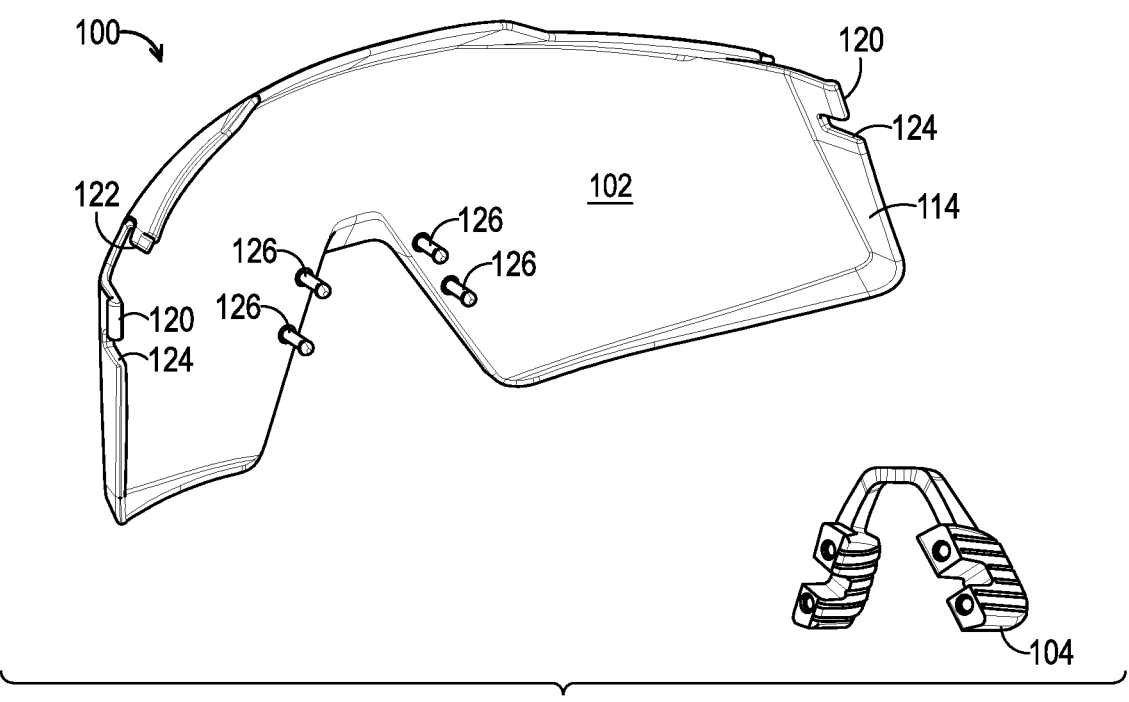
FIG. 11 is a view similar to FIG. 10, with temples removed and the nose pad in a different orientation.
Figure 12:
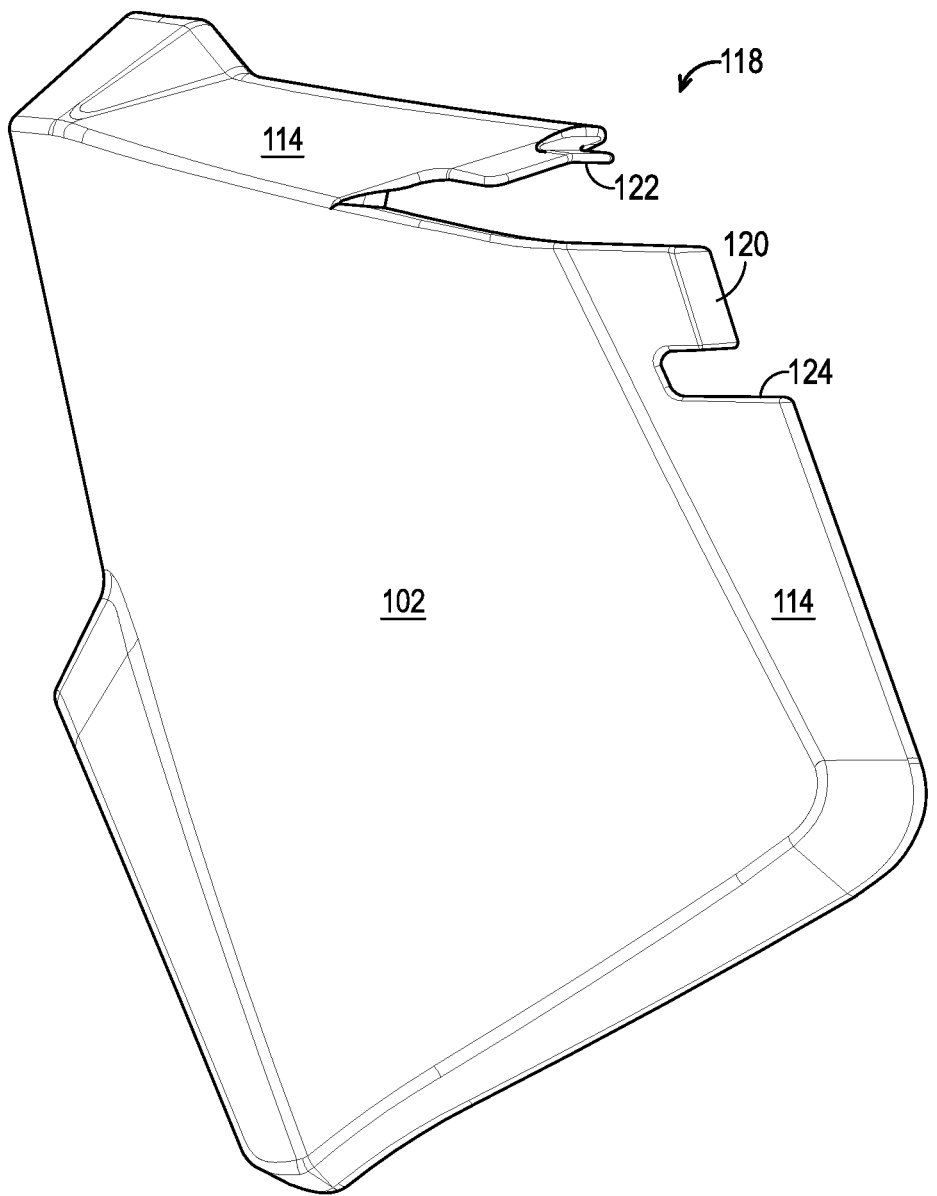
FIG. 12 is a side elevation view of a lens portion of the article of eyewear of FIG. 1.
Figure 13:
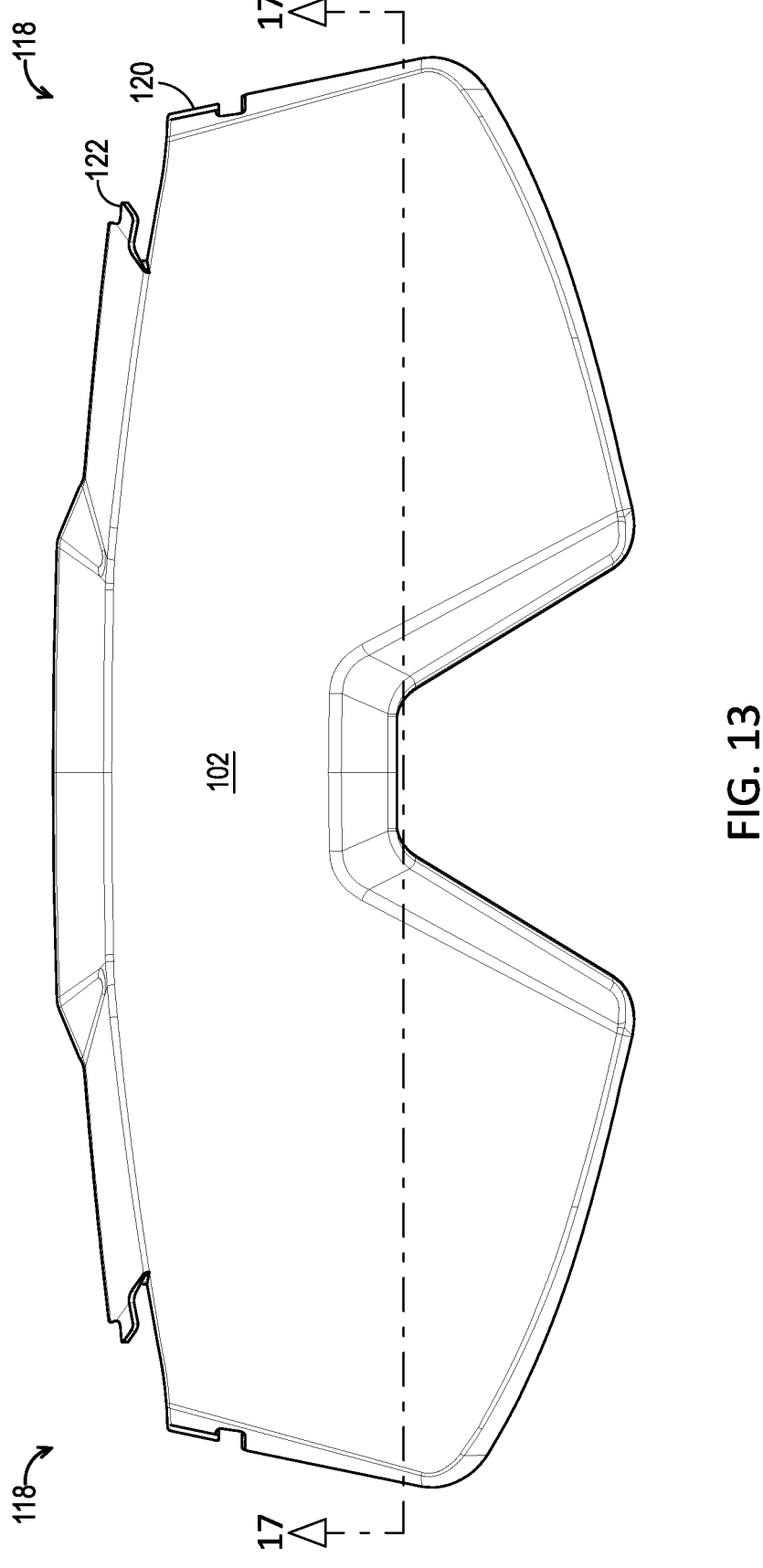
FIG. 13 is a front elevation view of the lens portion of FIG. 12.
Figure 14:
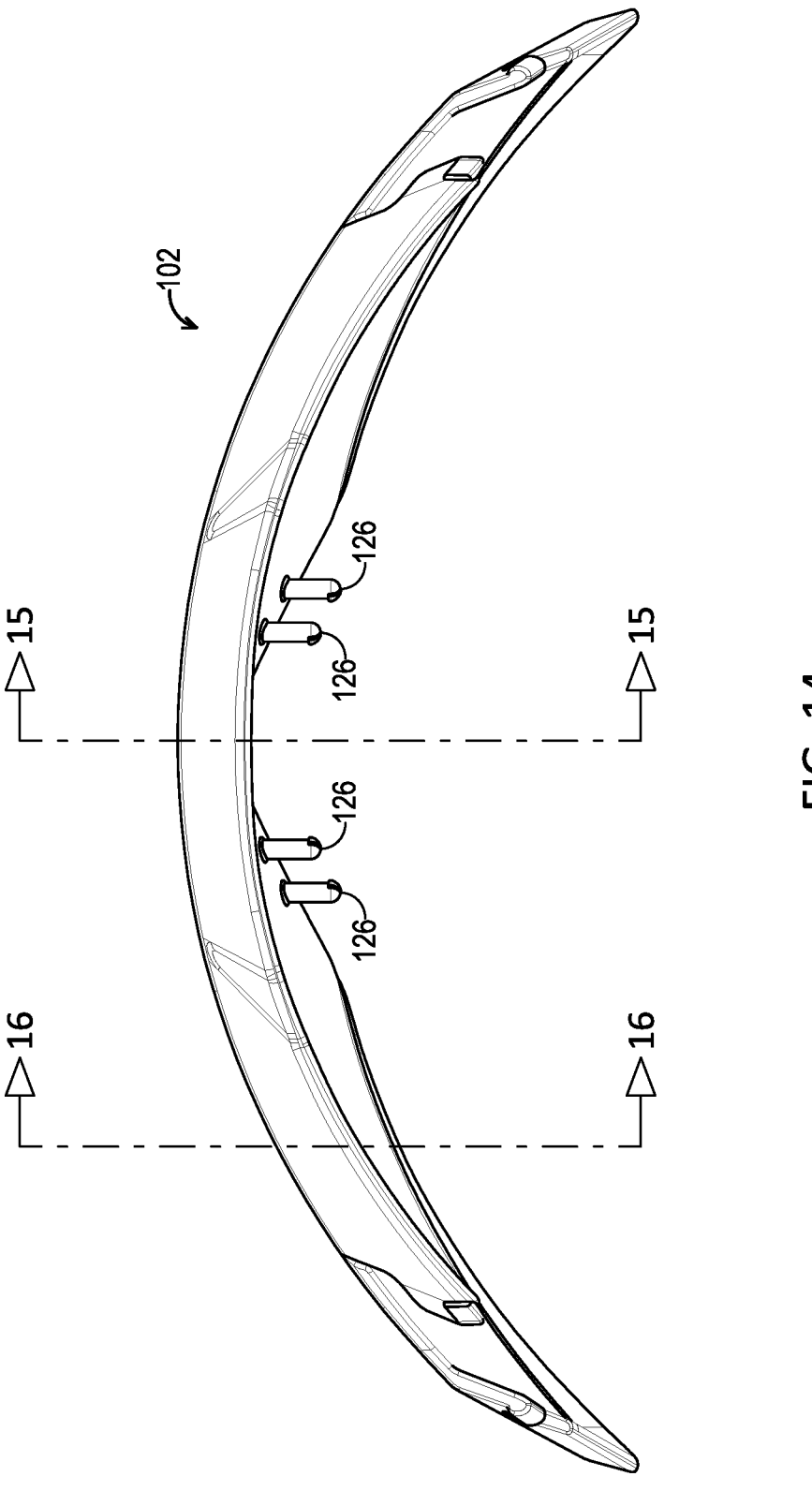
FIG. 14 is a top view of the lens of FIG. 12.

Various aspects and examples of frameless aerodynamic eyewear having replaceable temples, a removable nose pad, and a perimetric flange extending toward the face of a user, as well as related methods, are described below and illustrated in the associated drawings. Unless otherwise specified, eyewear in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Elongate" or "elongated" refers to an object or aperture that has a length greater than its own width, although the width need not be uniform. For example, an elongate slot may be elliptical or stadium-shaped, and an elongate candlestick may have a height greater than its tapering diameter. As a negative example, a circular aperture would not be considered an elongate aperture.

"Coupled" means connected, either permanently or releasably, whether directly or indirectly through intervening components.

"Resilient" describes a material or structure configured to respond to normal operating loads (e.g., when compressed) by deforming elastically and returning to an original shape or position when unloaded.

"Rigid" describes a material or structure configured to be stiff, non-deformable, or substantially lacking in flexibility under normal operating conditions.

"Elastic" describes a material or structure configured to spontaneously resume its former shape after being stretched or expanded.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

In this disclosure, one or more publications, patents, and/or patent applications may be incorporated by reference.

However, such material is only incorporated to the extent that no conflict exists between the incorporated material and the statements and drawings set forth herein. In the event of any such conflict, including any conflict in terminology, the present disclosure is controlling.

Overview

In general, eyewear of the present disclosure may include one or more of the following features:

Replaceable temples. For example, temples may be removably coupled to corner latching mechanisms of a one-piece lens.

Single, frameless, unitary lens having a three-dimensional aerodynamic shape including a cylindrical curvature from side to side and a rear-sloping perimeter flange or fairing, with a front-protruding nose bridge. All of these features are formed in one monolithic, continuous piece.

Removable, resilient nose pad, reusably coupled to the lens by way of a plurality of mushroom-shaped pegs.

Pegs unitary with the lens, i.e., the lens and pegs are formed as a single piece.

The pegs may be configured to be used as a mounting mechanism for one or more accessories, e.g., a prescription lens holder.

Examples, Components, and Alternatives

The following sections describe selected aspects of illustrative eyewear, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Eyewear

As shown in FIGS. 1-32, this section describes an illustrative pair of glasses (e.g., protective glasses and/or sunglasses) or performance eyewear 100. Eyewear 100 is an example of the aerodynamic eyewear described above.

With reference to FIGS. 1-14, eyewear 100 includes a unitary lens 102, a removable nose pad 104 removably coupled to a nose bridge of the lens, and a pair of temples 106 removably coupled to lateral corners of the lens. Each of the temples includes a mounting portion 108 rotatably or hingedly coupled to an arm portion 110.

Lens 102 is a three-dimensional lens curved from side to side such that a main portion generally conforms to a fixed cylindrical curve, with lateral ends extending rearward (e.g., toward the face of a wearer). Lens 102 further includes a nose bridge protrusion 112 and an angled perimeter portion or flange 114 extending rearward along the top and bottom edges of the lens. This perimetric flange may be referred to as a cupped edge, a lip, or a bevel. Lens 102 may comprise any suitable material configured to maintain the three-dimensional structure absent a frame, and may include a coating or treatment configured to provide anti-shattering, ultraviolet protection, general tinting, etc.

The angled perimeter portion extends transversely from the top and bottom of the main portion toward the user's head, such that a relatively sharp crease or fold line is present at the transition between the main lens and the perimetric flange. Accordingly, the lens generally conforms to a user's face, and the rear-sloping perimetric flange extends to at least partially fill the gap between the main front portion of the lens and the user's face. The top portion further includes a central raised portion. Folding of the top and bottom of the lens in a rearward direction may enhance aerodynamic performance, strengthen and/or rigidify the lens, eliminate the need for a separate frame, facilitate debris exclusion, and/or the like.

Figure 15:
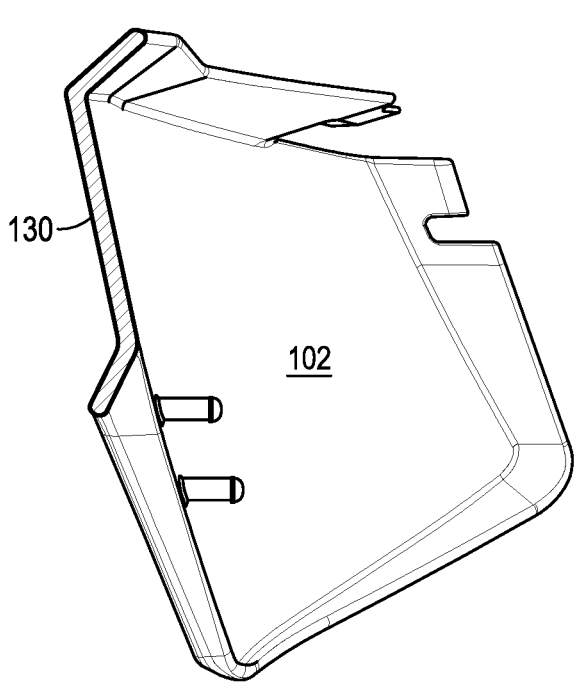
FIG. 15 is a first sectional view of the lens of FIG. 12, taken at line 15-15 of FIG. 14.
Figure 16:
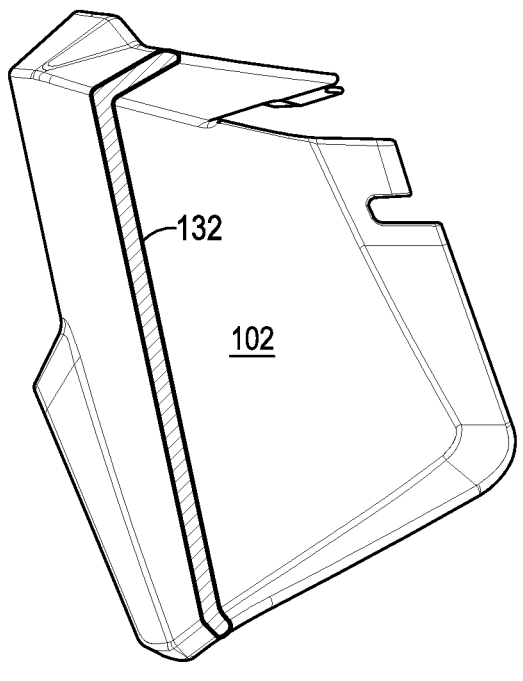
FIG. 16 is a second sectional view of the lens of FIG. 12, taken at line 16-16 of FIG. 14.
Figure 17:
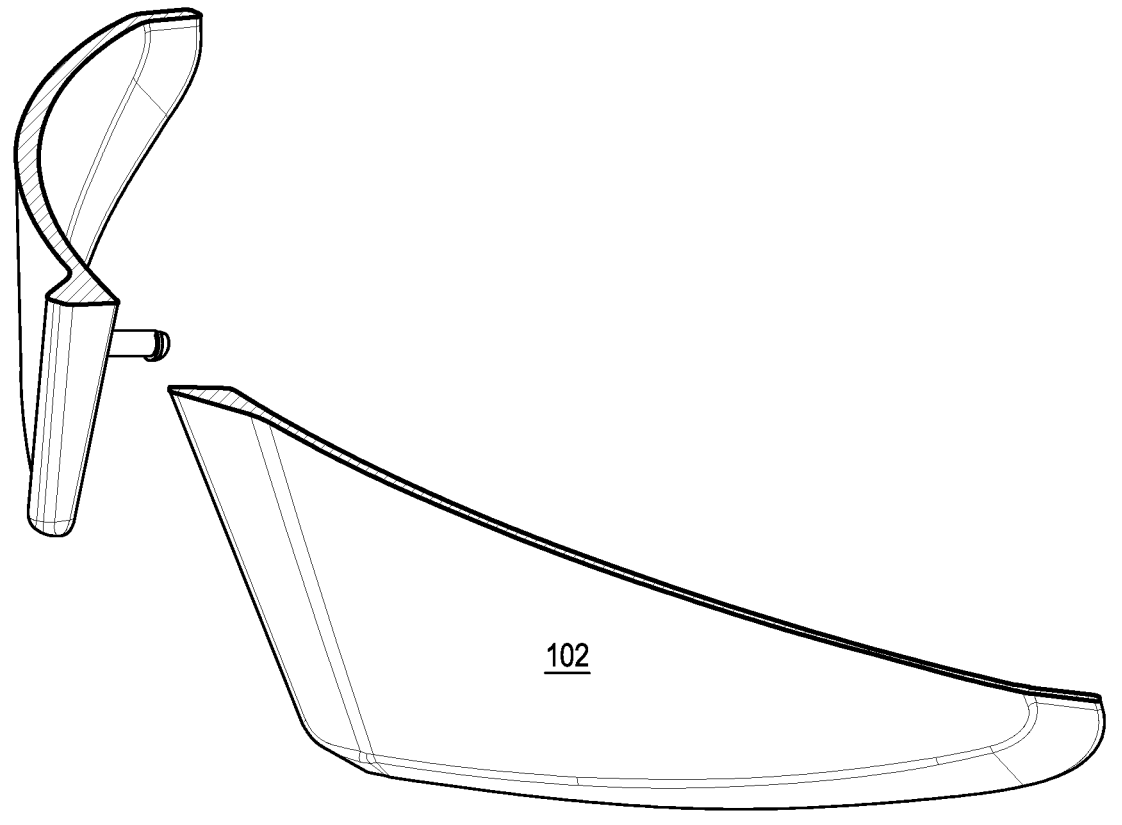
FIG. 17 is a third sectional view of the lens of FIG. 12, taken at line 17-17 of FIG. 13.
Figure 18A:
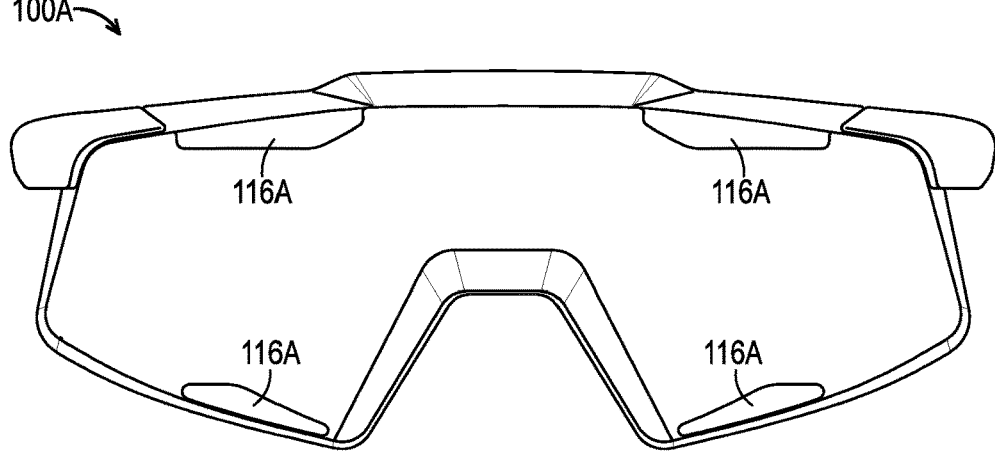
FIGS. 18A-18I depict front views of various embodiments of eyewear of the present disclosure, each of which includes one or more vents or vent apertures through the lens.
Figure 18B:
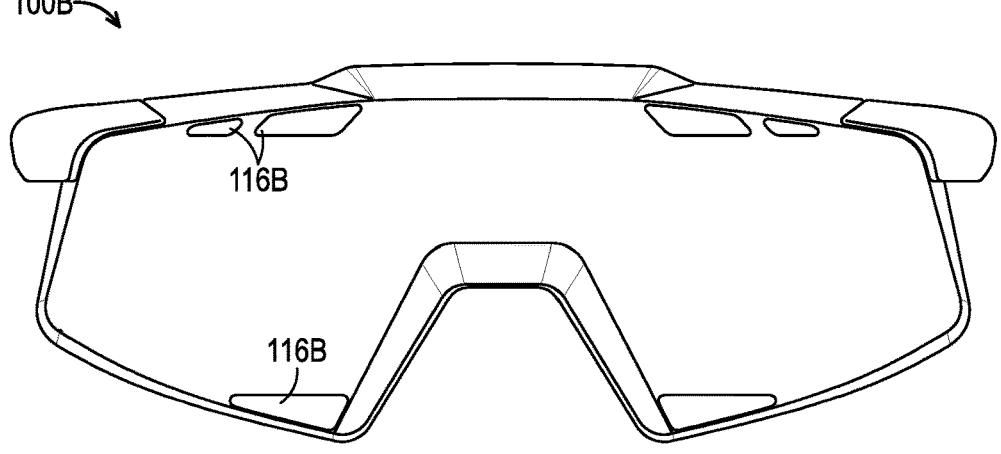
Figure 18C:
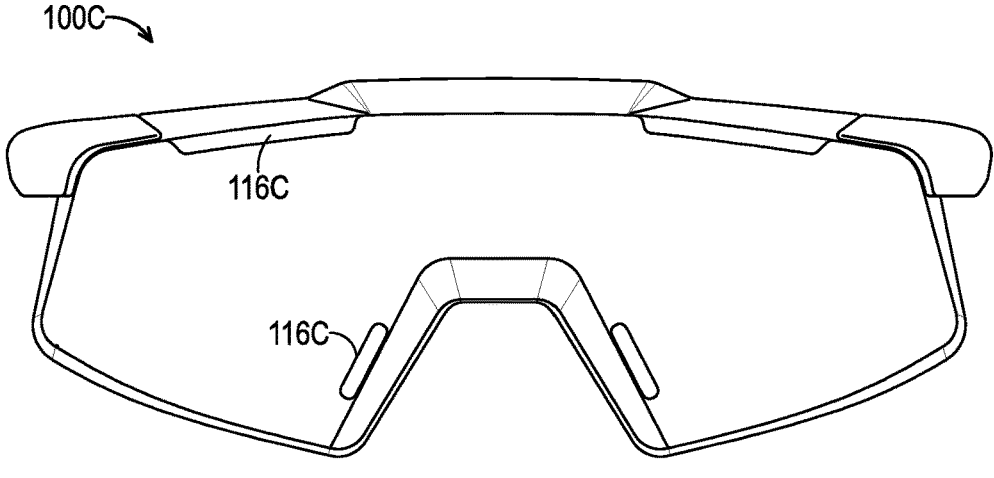
Figure 18D:
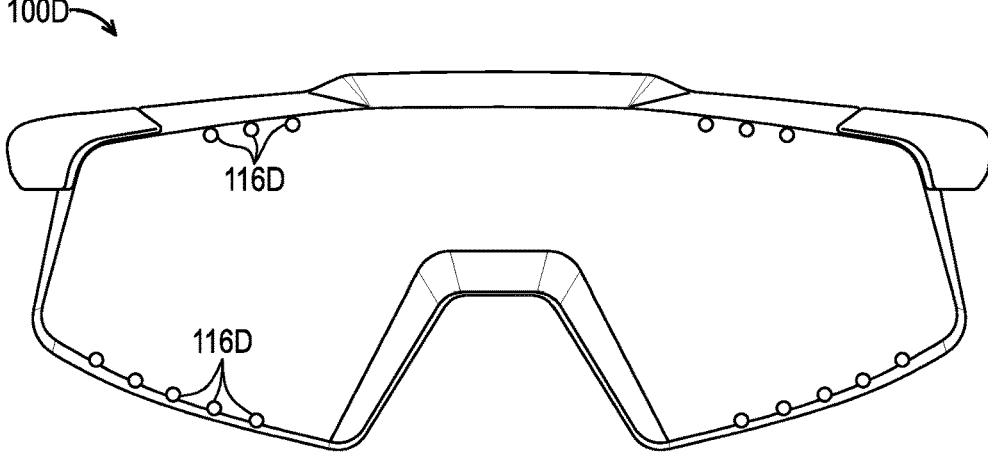
Figure 18E:
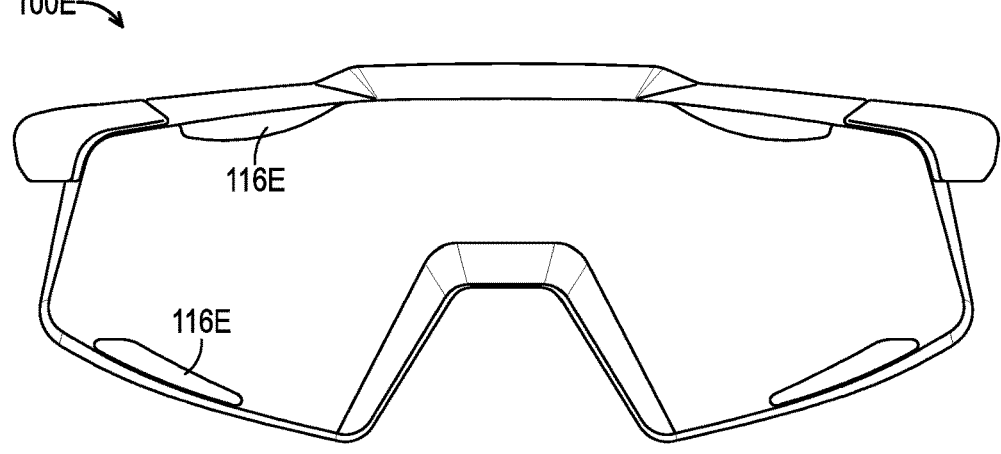
Figure 18F:
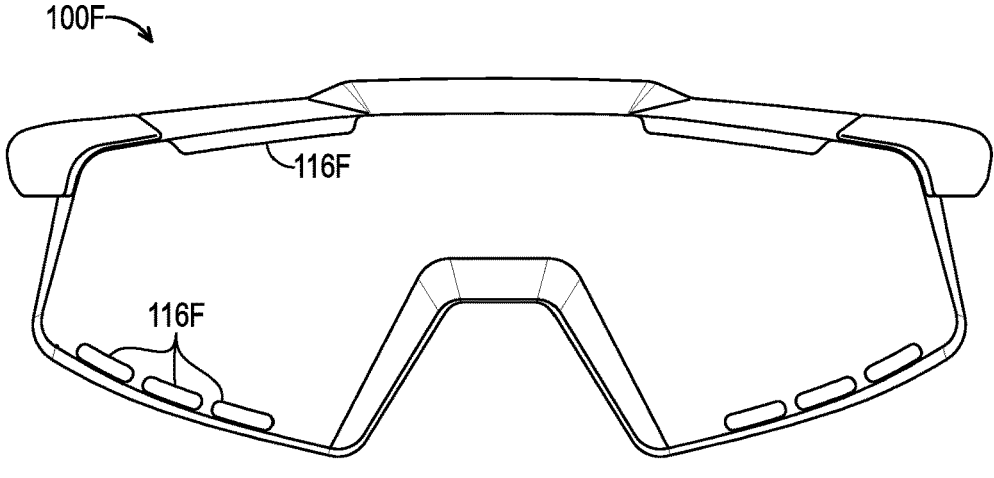
Figure 18G:
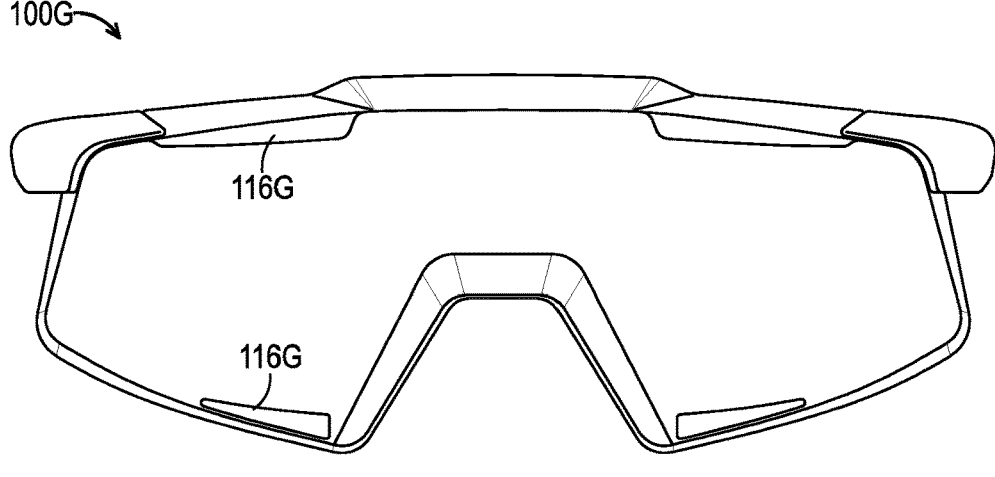
Figure 18H:
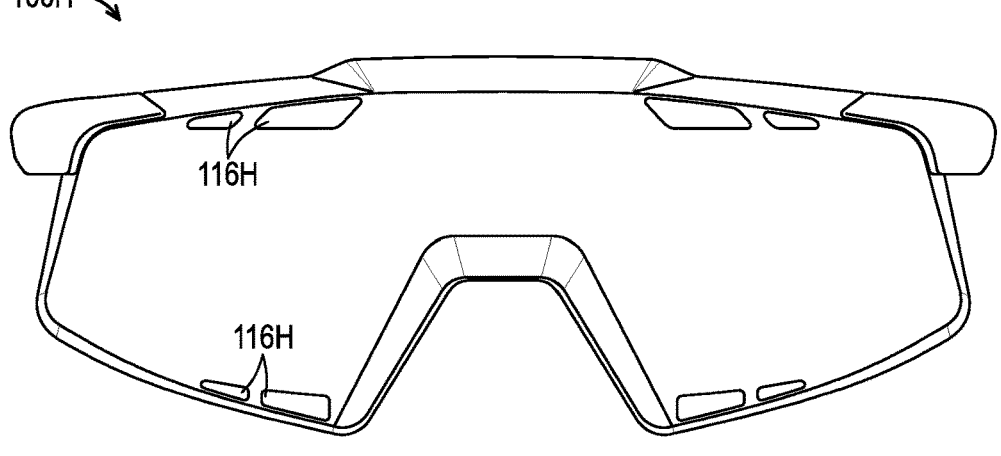
Figure 18I:
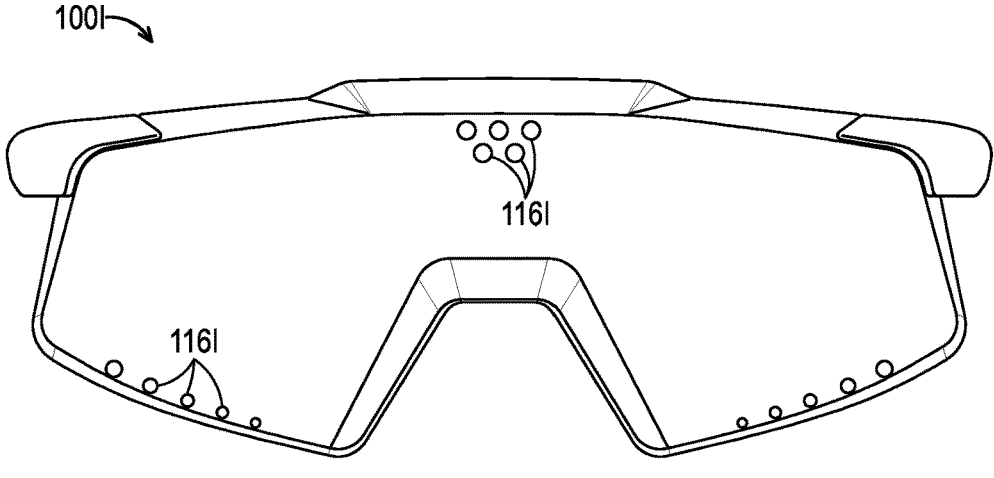
Figure 19:
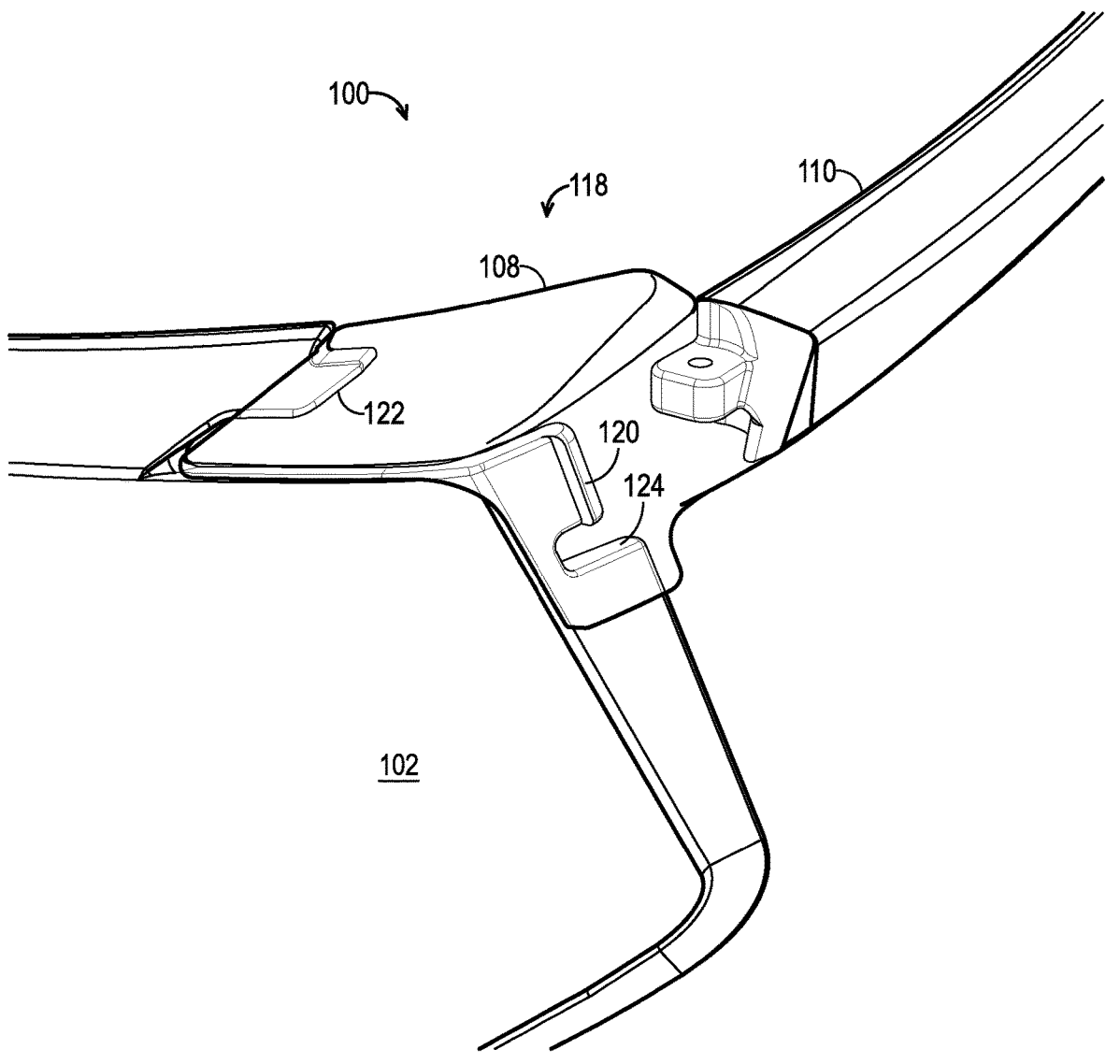
FIG. 19 is a partial view of the eyewear of FIG. 1, showing a front lateral corner of the eyewear of FIG. 1, with a temple mounting portion made transparent to reveal underlying structures.
Figure 20:
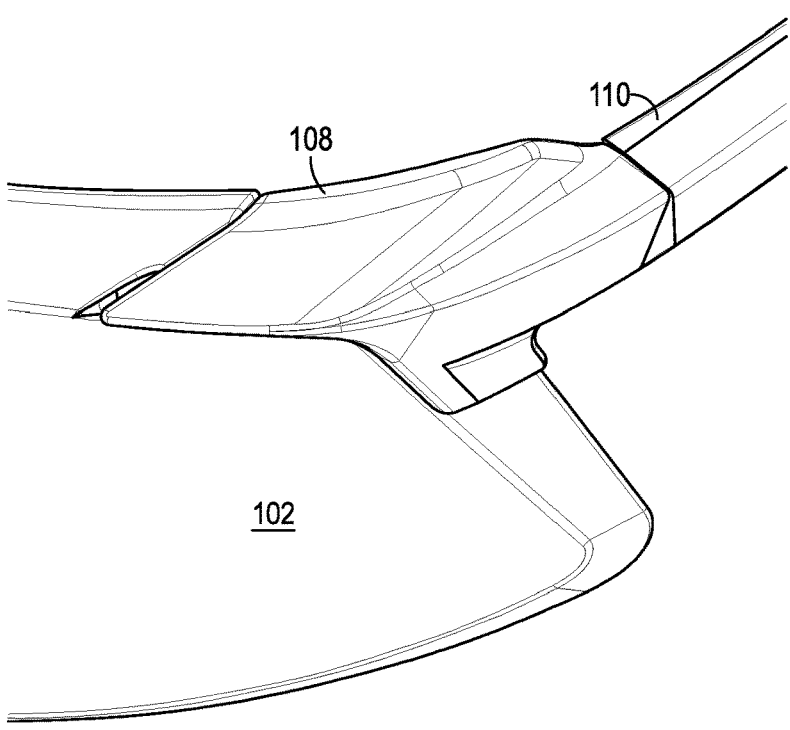
FIGS. 20-23 depict the partial view of FIG. 19 in various states, with the temple partially removed, made transparent (FIG. 22), and removed altogether (FIG. 23).
Figure 21:
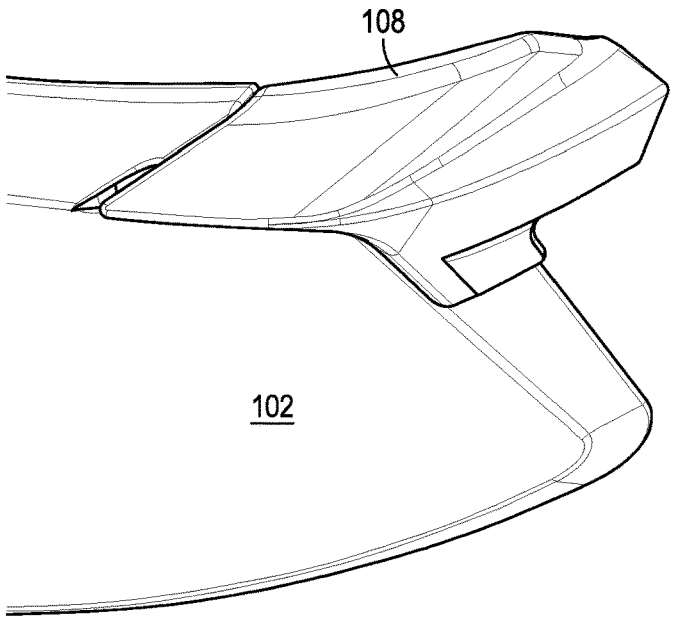
Figure 22:
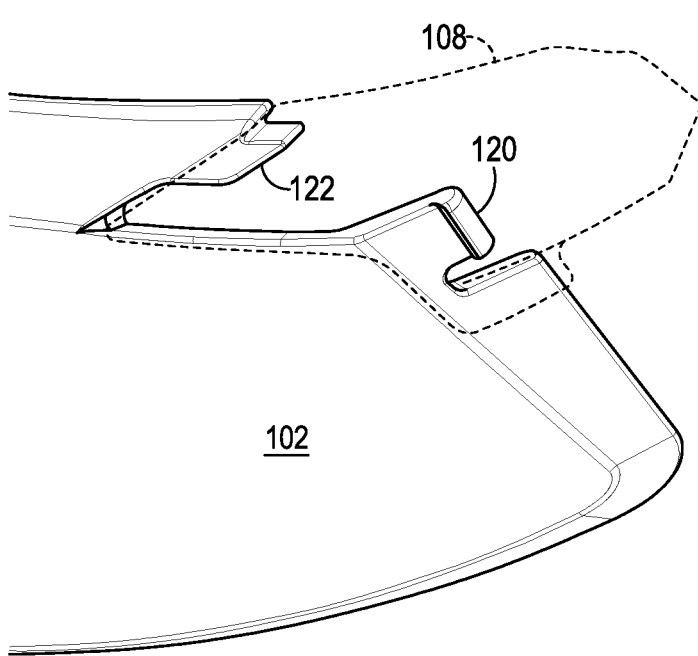
Figure 23:
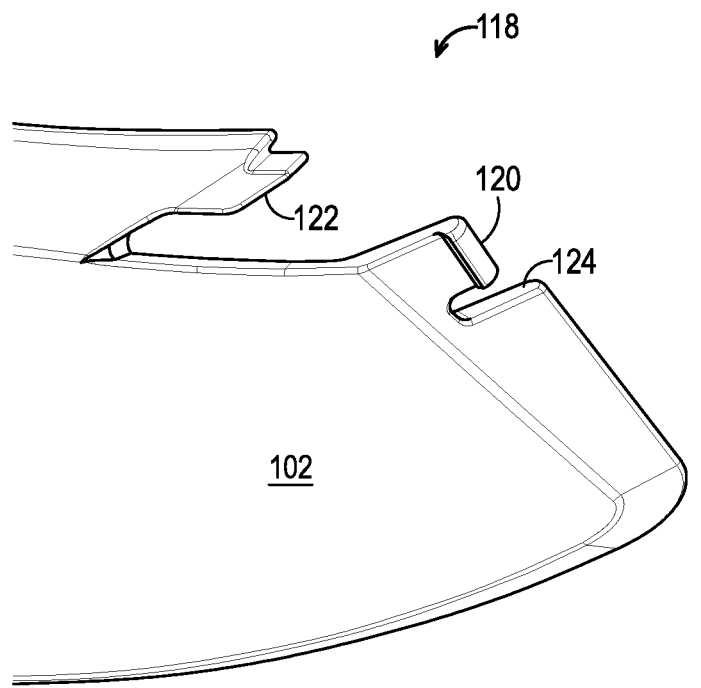
Figure 24:
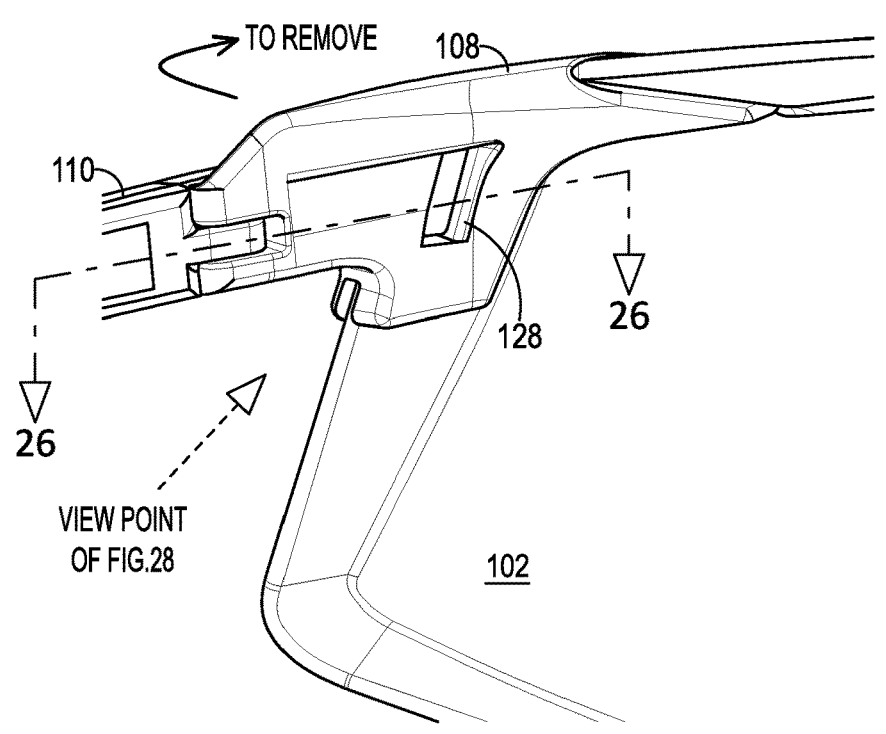
FIGS. 24 and 25 depict the partial view of FIG. 19 from an opposite viewpoint.
Figure 25:
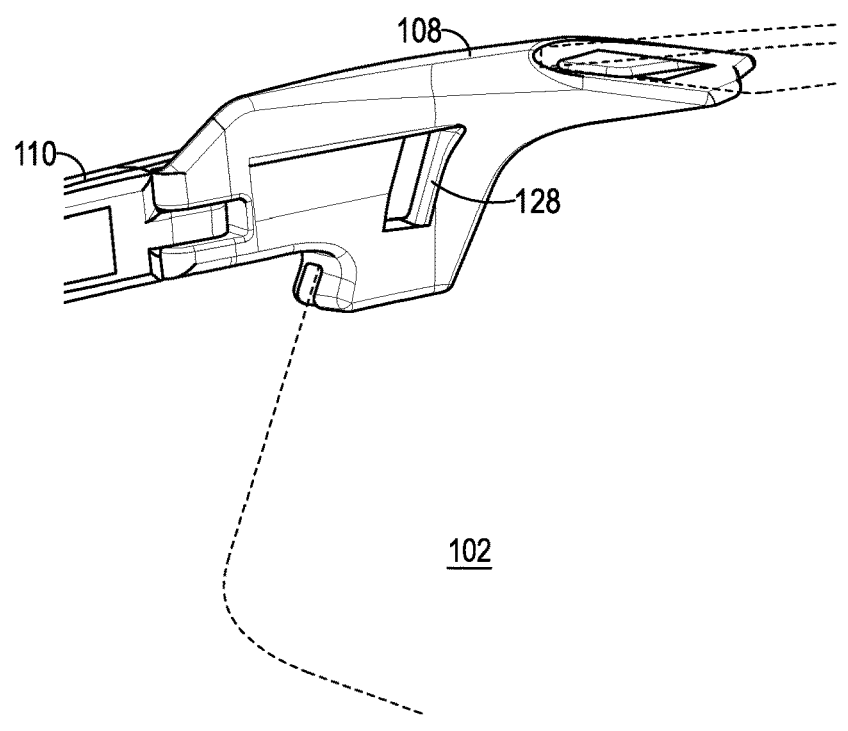
Figure 26:
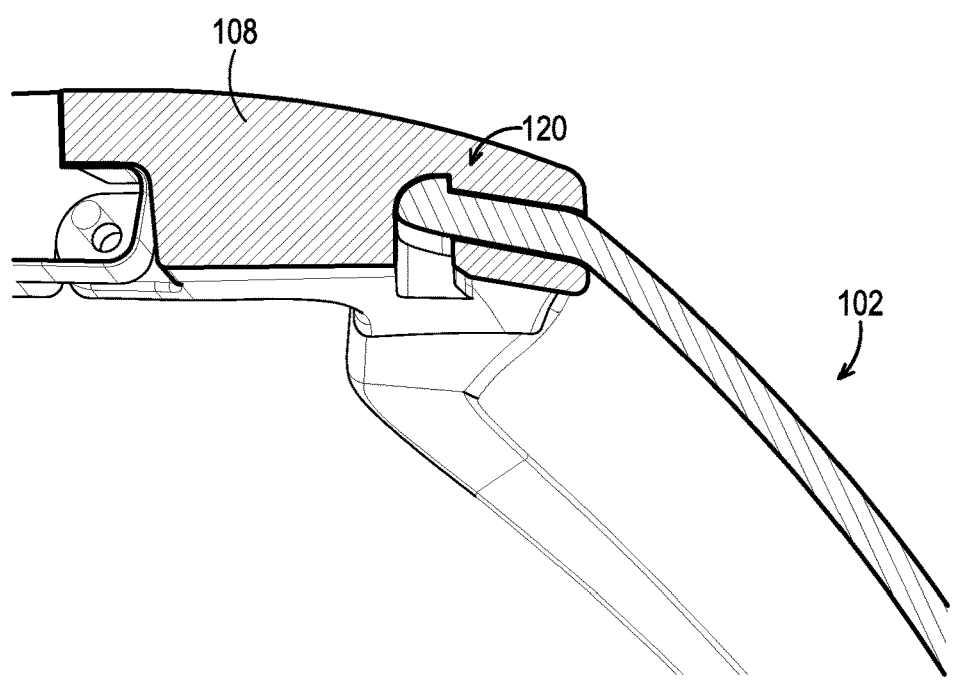
FIGS. 26 and 27 are sectional views taken at line 26-26 of FIG. 24, showing an interaction between a hook portion of the lens and a receiving aperture of the temple mounting portion.
Figure 27:
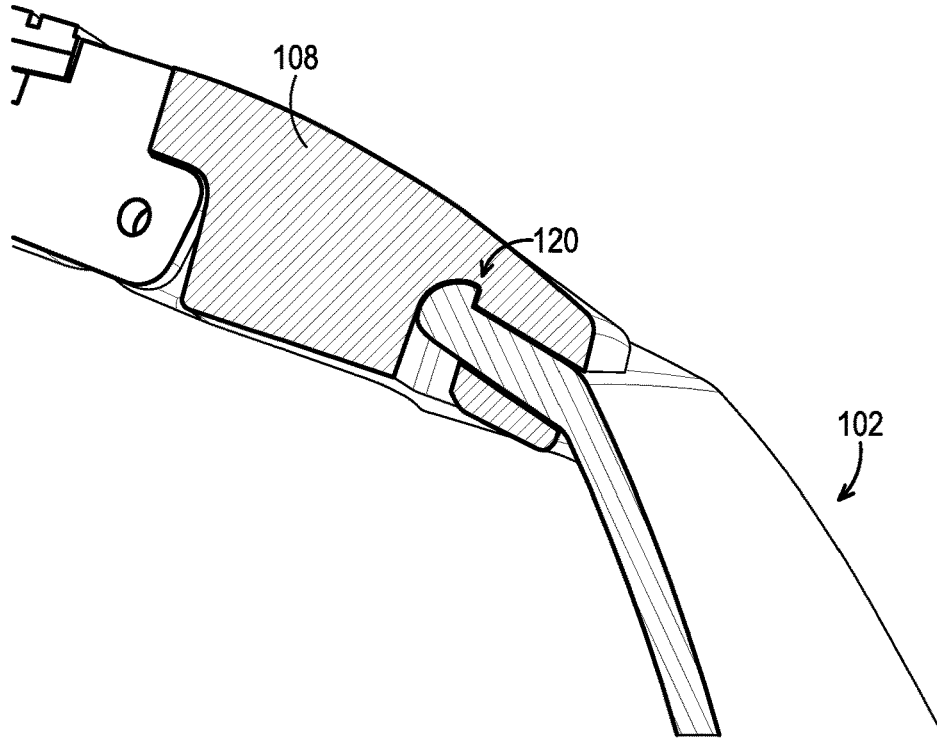
Figure 28:
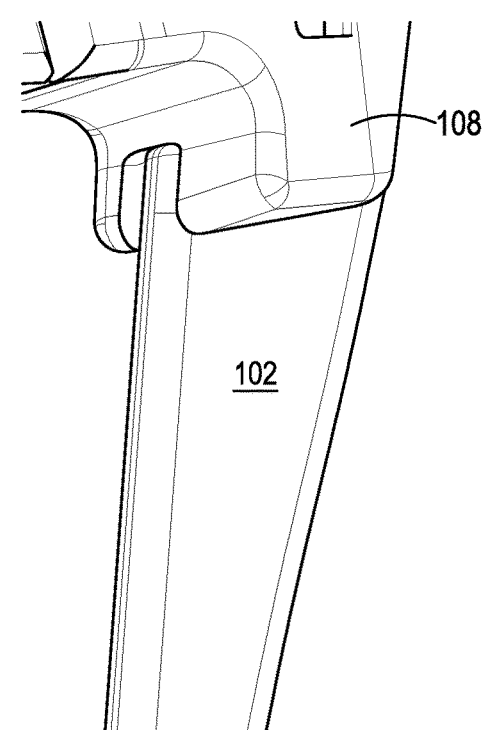
FIGS. 28 and 29 are partial views further depicting interactions between the lens and the temple mounting portion.
Figure 29:
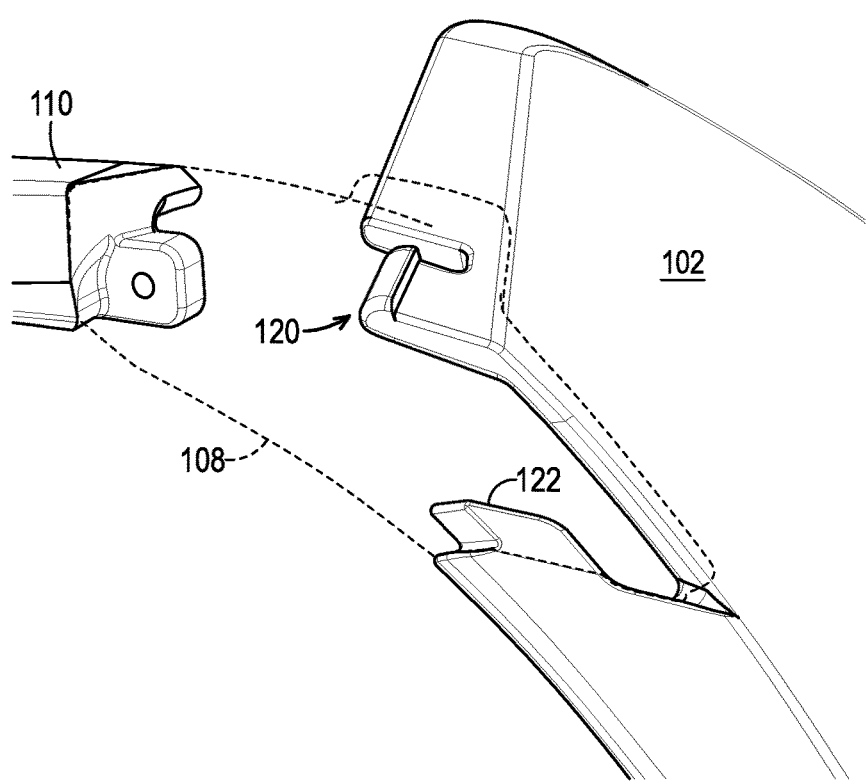
Figures 30, 31:
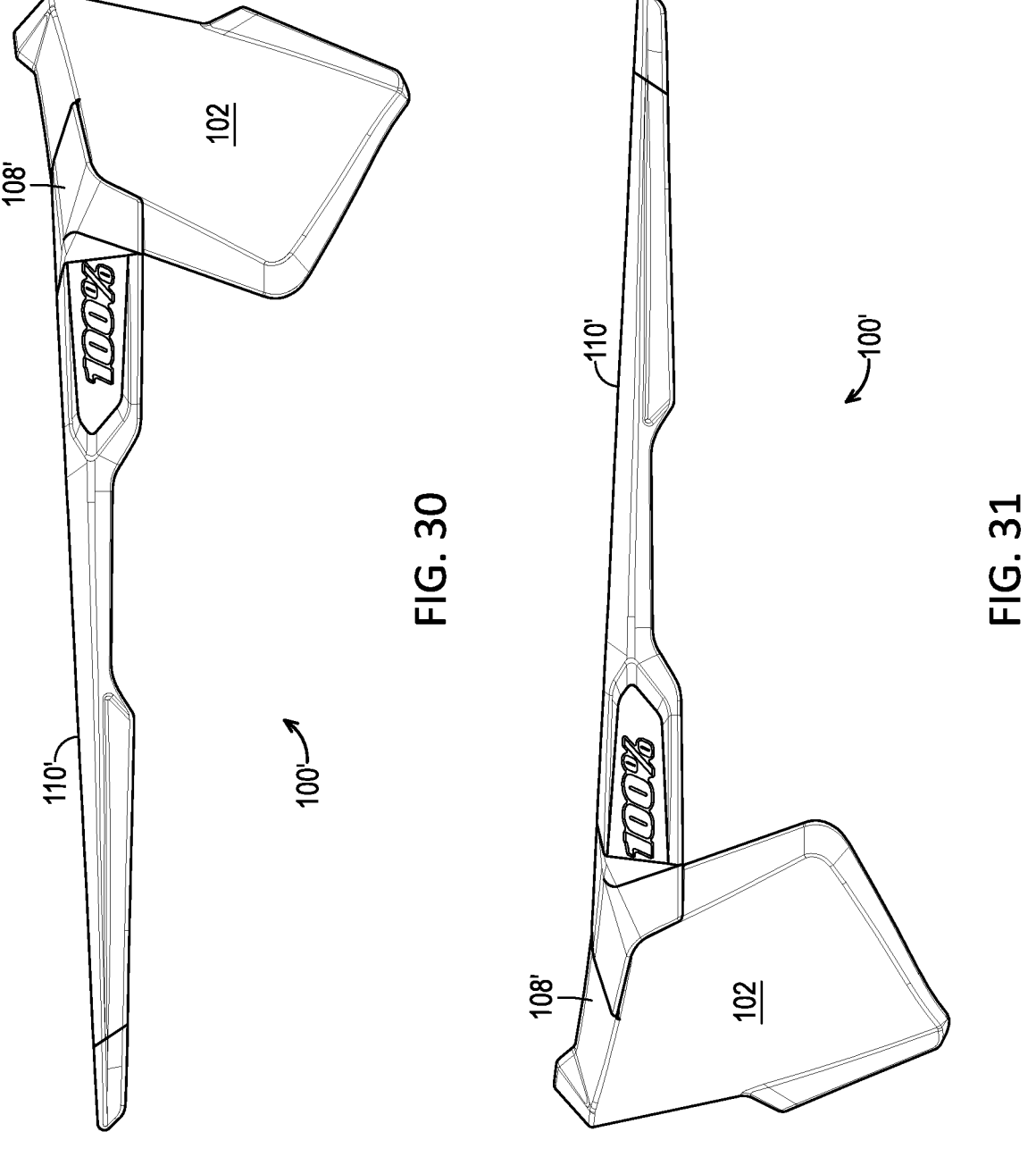
FIGS. 30-32 depict a second article of eyewear with a lens identical to that of FIG. 1, coupled to a different pair of temples.
Figure 32:
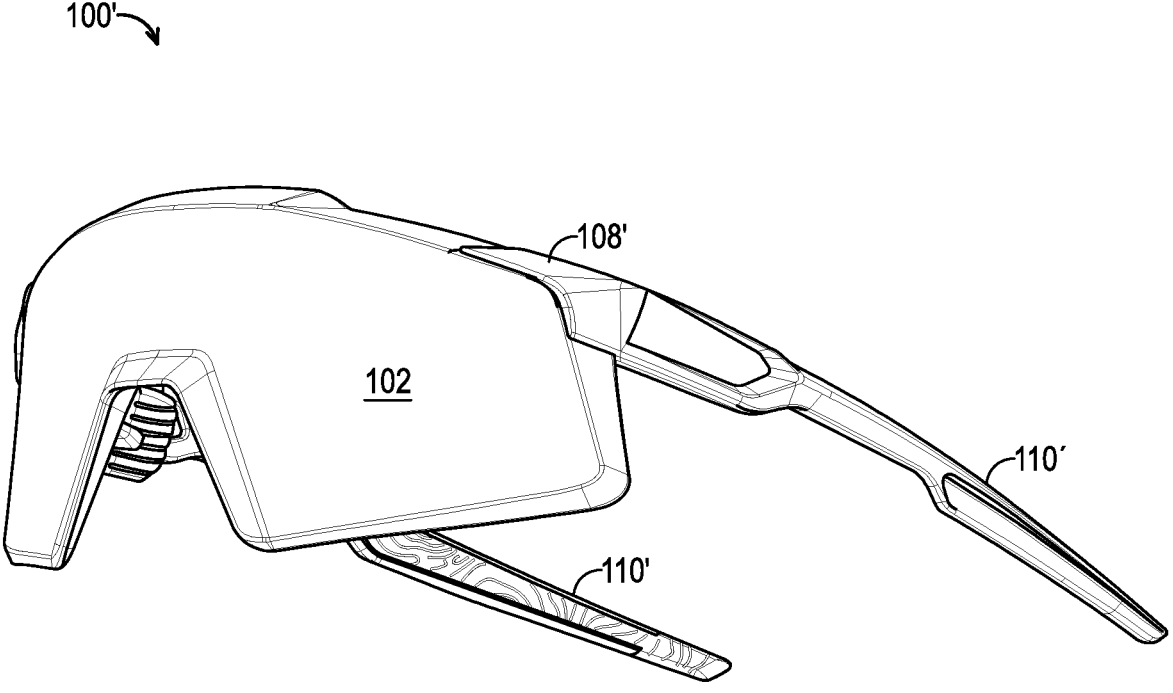

As shown in the cross sections of FIGS. 15 and 16, a vertical cross section of lens 102 taken in the area of the nose bridge has an S-shaped profile 130 (e.g., a substantially or generally rectilinear S-shape), and a vertical cross section of lens 102 taken in an area between the nose bridge and the lateral ends of the lens has a C-shaped profile 132 (e.g., a substantially or generally rectilinear C-shape). FIG. 17 is a horizontal cross section of lens 102, and illustrates the thickening of lens 102 in the central area to create the protruding nose bridge in that location.

Nose pad 104 is coupled to pins 126 (AKA pegs) which extend rearward from the lens and fit into corresponding holes in the nose pad. Pins 126 and lens 102 may be formed as a single piece, e.g., in a single molding operation, e.g., in an injection molding operation involving a single mold. Nose pad 104 may comprise any suitable materials and structures configured to comfortably support the eyewear on a wearer's nose. Pegs 126 are rigid structures having enlarged ends to resist slippage of the nose pad from the lens, while allowing easy removal by manually pulling the nose pad off the pegs. When the nose pad is removed, one or more accessories may be coupled to the lens using the pegs, either between the nose pad and the lens or as a replacement for the nose pad.

In some examples, one or more vents or apertures 116A-116I are formed in the main portion of the lens (i.e., exclusive of the rear-sloping perimeter portion). FIGS. 18A through 18I show various suitable examples of vent patterns and/or aperture placement. Illustrative eyewear 100A through 100I has corresponding respective vents 116A through 116I. When present, the vents are configured to allow air to flow from the front of the lens to the rear of the lens, facilitating cooling for the wearer and/or defogging for the lens. Any of the eyewear described and/or shown in this disclosure may be manufactured to include any one or more of the vents shown in FIGS. 18A-18I, among others.

Referring now to FIGS. 19-29, lateral ends of the lens each include a temple attachment portion 118 (e.g., at an upper corner), each temple attachment portion 118 configured to mate with a respective one of the mounting portions 108. To achieve this function, each attachment portion 118 of the lens includes a hook 120, an upper stabilizing tab 122, and a lateral stabilizing tab 124, all of which are integrated into the lens (i.e., are formed as part of the unitary lens). Stabilizing tabs 122 and 124 are received by corresponding recesses in the mounting portion. Specifically, tab 122 extends laterally from a top portion of the lens in a generally horizontal direction, and mates with (i.e., fits into or is received by) a corresponding opening or recess in mounting portion 118. Tab 124 comprises an upward-facing edge portion of the lateral, angled perimeter of the lens, and extends in a generally vertical direction to be received by a corresponding channel formed in the mounting portion.

Hook 120 of attachment portion 118 is configured to provide a snap-fit into a corresponding recess of the mounting portion, such that the hook prevents the temple from being dislodged from the lens during normal use. To remove the temple from the lens, the temple and mounting portion are pivoted or rotated outward (see arrows) with respect to each other until the hook disengages and can be pulled out of the aperture. For example, a distal end of the temple arm may be urged outward. A window 128 is formed through an inward-facing side of mounting portion 108 to facilitate removal (e.g., giving the hook-end sufficient room to disengage from the mounting portion). Window 128 may also be configured to facilitate insertion of the distal end of hook 120 into the mounting portion before snapping into position around the corresponding internal edge. See FIGS. 26-27.

B. Illustrative Temple Replacement Method

This section describes steps of an illustrative method for replacing temples of an article of eyewear (e.g., eyewear 100). Aspects of the eyewear described above may be utilized in the method steps described below. Where appropriate, reference may be made to components and systems that may be used in carrying out each step. These references are for illustration, and are not intended to limit the possible ways of carrying out any particular step of the method.

In a first step, the method includes urging a first temple having a first mounting portion fixed to a lens and a first arm pivotably coupled to the first mounting portion, such that the first mounting portion rotates relative to the lens and releases a hook of the lens from an engagement surface of the first mounting portion. In some examples, the first mounting portion rotates relative to the lens by passing through a transverse plane (e.g., as opposed to a sagittal plane). In some examples, the first mounting portion rotates relative to the lens such that the first arm and the first mounting portion rotate in a clockwise or counterclockwise direction when viewed from a perspective above the lens (e.g., in a plan view).

In a second step, the method includes disengaging the first temple from the lens. Disengaging the first temple from the lens may include sliding the first mounting portion off of the hook.

In a third step, the method includes engaging a second temple with the lens, wherein the second temple includes a second mounting portion and a second arm, by inserting the hook of the lens into an opening of the second mounting portion.

In a fourth step, the method includes urging the second mounting portion until the hook of the lens snaps into place relative to the engagement surface of the second mounting portion.

In the present method, the lens may be a unitary lens configured to cover both eyes when worn. In some examples, the lens is frameless.

C. Illustrative Combinations and Additional Examples

This section describes additional aspects and features of eyewear of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An article of eyewear, comprising:

a rigid lens configured to cover both eyes of a wearer when worn, the lens having a central nose bridge and a permanent curvature from side to side;

the lens including a main body, a top fairing extending rearward from an upper edge of the main body, and a lower flange extending rearward from a lower edge of the main body; and a pair of temples, each temple including a mounting portion configured to releasably mate with the lens and a temple arm pivotably coupled to the mounting portion;

wherein a first vertical cross section taken at the nose bridge of the lens has a generally rectilinear S-shaped profile, and a second vertical cross section taken in an area between the nose bridge and a lateral end of the lens has a generally rectilinear C-shaped profile.

A1. The article of eyewear of A0, further comprising a nose pad coupled to pegs extending rearward from the central nose bridge.

A2. The article of eyewear of A0 or A1, wherein each of the mounting portions includes a channel and a recess, each upper lateral portion of the lens includes at least one tab received by the channel and a hook received by the recess in a snap-fit.

A3. The article of eyewear of A2, wherein the at least one tab and the hook are formed as a single piece with the lens.

A4. The article of eyewear of A2, wherein the at least one tab comprises a horizontal tab and a vertical tab.

A5. The article of eyewear of A2, wherein the mounting portion of each of the temples includes a medial window disposed to be adjacent the hook when the hook is engaged with the mounting portion.

A6. The article of eyewear of any one of A0 through A5, wherein the lens comprises an injection-molded plastic.

B0. A method for replacing temples of an article of eyewear, the method comprising:

urging a first temple having a first mounting portion fixed to a lens and a first arm pivotably coupled to the first mounting portion, such that the first mounting portion rotates relative to the lens and releases a hook of the lens from an engagement surface of the first mounting portion;

disengaging the first temple from the lens;

engaging a second temple with the lens, wherein the second temple includes a second mounting portion and a second arm, by inserting the hook of the lens into an opening of the second mounting portion; and urging the second mounting portion until the hook of the lens snaps into place relative to the engagement surface of the second mounting portion.

B1. The method of B0, wherein disengaging the first temple from the lens comprises sliding the first mounting portion off of the hook.

B2. The method of B0 or B1, wherein the first mounting portion rotates relative to the lens by passing through a transverse plane.

B3. The method of any one of B0 through B2, wherein the first mounting portion rotates relative to the lens such that the first arm and the first mounting portion rotate in a clockwise or counterclockwise direction when viewed from a perspective above the lens (e.g., in a plan view).

B4. The method of any one of B0 through B3, wherein the lens is a unitary lens configured to cover both eyes when worn.

B5. The method of B4, wherein the lens is frameless.

B6. The method of any one of B0 through B5, wherein the lens and the first temple are part of the eyewear of any one of A0 through A6.

B7. The method of any one of B0 through B5, wherein the lens and the first temple are part of the eyewear of any one of C0 through C16.

C0. An article of eyewear, comprising:

a frameless, rigid lens configured to cover both eyes of a wearer when worn, the lens having a generally cylindrical curvature in a side-to-side direction, such that lateral ends of the lens are rearward of a central nose bridge; and a pair of temples, each temple including a mounting portion configured to releasably mate with the lens and a temple arm pivotably coupled to the mounting portion.

C1. The article of eyewear of C0, further comprising a nose pad coupled to the nose bridge of the lens by one or more pegs unitary with and protruding rearward from the lens. In some examples, each of the pegs has an enlarged distal end.

C2. The article of eyewear of C0 or C1, wherein the lens includes a main portion oriented up-and-down (e.g., having a generally vertical orientation) and a top flange angled rearward from a top side of the main portion.

C3. The article of eyewear of any one of paragraphs C0 through C2, wherein the lens is frameless other than the temples.

C4. The article of eyewear of any one of paragraphs C0 through C3, wherein the lens includes side and bottom flange portions that angle rearward from a perimeter of the main portion of the lens.

C5. The article of eyewear of any one of paragraphs C0 through C4, wherein the nose bridge of the lens protrudes in a forward direction.

C6. The article of eyewear of any one of paragraphs C0 through C5, wherein the nose bridge and the lens are formed as a single piece.

C7. The article of eyewear of any one of paragraphs C0 through C6, wherein the mounting portion of each temple has a channel configured to receive an edge of the lens.

C8. The article of eyewear of any one of paragraphs C0 through C7, wherein the mounting portion of each temple has a recess configured to receive a tab of the lens.

C9. The article of eyewear of any one of paragraphs C0 through C8, wherein the mounting portion of each temple has a recess configured to receive a hook portion of the lens.

C10. The article of eyewear of C9, wherein the mounting portion further includes an inward-facing (i.e., medial) window adjacent the recess, wherein the window is configured to provide space for the hook to be selectively dislodged by the user.

C11. The article of eyewear of any one of paragraphs C0 through C10, wherein the lens has an S-shaped cross section at the nose bridge and a C-shaped cross section at a position between the nose bridge and one of the lateral ends.

C12. The article of eyewear of any one of paragraphs C0 through C11, further comprising one or more vents formed through the lens.

C13. The article of eyewear of C12, wherein the one or more vents are formed in a main portion of the lens, excluding any rearward angled flange portions of the lens.

C14. The article of eyewear of any one of paragraphs C0 through C13, wherein the same lens is usable with two or more different styles of temples.

C15. The article of eyewear of any one of paragraphs C0 through C14, wherein the lens includes a pair of mounting areas, each of which includes a hook portion configured to mate with the mounting portion of a corresponding one of the temples.

C16. The article of eyewear C15, wherein the mounting area further comprises one or more tabs configured to mate with corresponding recesses or channels in the mounting portion of the temple.

Advantages, Features, and Benefits

The different embodiments and examples of the eyewear described herein provide several advantages over known solutions. For example, illustrative embodiments and examples described herein have enhanced aerodynamic performance.

Additionally, and among other benefits, illustrative embodiments and examples described herein facilitate easy replacement of temples while reusing a same lens.

Additionally, and among other benefits, illustrative embodiments and examples described herein create a stable and secure but releasable connection between the temples and the lens.

Additionally, and among other benefits, illustrative embodiments and examples described herein include a unitary lens structure configured to facilitate debris exclusion, enhance strength and rigidity, and to avoid the need for a separate frame to provide structure.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. An article of eyewear, comprising:
   a frameless, rigid lens configured to cover both eyes of a wearer when worn, the lens having a generally cylindrical curvature in a side-to-side direction, such that lateral ends of the lens are rearward of a central nose bridge; and
   a pair of temples, each temple including a mounting portion configured to releasably mate with the lens and a temple arm pivotably coupled to the mounting portion;
   wherein the lens includes side and bottom flange portions that angle rearward from a perimeter of the lens.

2. The article of eyewear of claim 1, further comprising a nose pad coupled to the nose bridge of the lens by one or more pegs unitary with and protruding rearward from the lens.

3. The article of eyewear of claim 1, wherein the lens includes a main portion oriented up-and-down and a top flange angled rearward from a top side of the main portion.

4. The article of eyewear of claim 1, wherein the nose bridge and the lens are formed as a single piece, and the nose bridge protrudes in a forward direction.

5. The article of eyewear of claim 1, wherein the mounting portion of each temple has a channel configured to receive an edge of the lens.

6. The article of eyewear of claim 1, wherein the mounting portion of each temple has a recess configured to receive a tab of the lens.

7. The article of eyewear of claim 1, wherein the mounting portion of each temple has a recess configured to receive a hook portion of the lens.

8. The article of eyewear of claim 7, wherein the mounting portion further includes a medial window adjacent the recess, wherein the window is configured to provide space for the hook portion to be selectively dislodged by a user.

9. The article of eyewear of claim 1, wherein the lens has an S-shaped cross section at the nose bridge and a C-shaped cross section at a position between the nose bridge and one of the lateral ends.

10. The article of eyewear of claim 1, wherein the lens includes a pair of mounting areas, each of which includes a hook portion configured to mate with the mounting portion of a corresponding one of the temples.

11. The article of claim 10, wherein the mounting area further comprises one or more tabs configured to mate with corresponding recesses or channels in the mounting portion of the temple.

12. An article of eyewear, comprising:
   a rigid lens configured to cover both eyes of a wearer when worn, the lens having a central nose bridge and a permanent curvature from side to side;
   the lens including a main body, a top fairing extending rearward from an upper edge of the main body, and a lower flange extending rearward from a lower edge of the main body; and
   a pair of temples, each temple including a mounting portion configured to releasably mate with the lens and a temple arm pivotably coupled to the mounting portion;
   wherein a first vertical cross section taken at the nose bridge of the lens has a generally rectilinear S-shaped profile, and a second vertical cross section taken in an area between the nose bridge and a lateral end of the lens has a generally rectilinear C-shaped profile; and
   wherein each of the mounting portions includes a channel and a recess, each upper lateral portion of the lens includes at least one tab received by the channel and a hook received by the recess in a snap-fit.

13. The article of eyewear of claim 12, further comprising a nose pad coupled to pegs extending rearward from the central nose bridge.

14. The article of eyewear of claim 12, wherein the at least one tab and the hook are formed as a single piece with the lens.

15. The article of eyewear of claim 12, wherein the at least one tab comprises a horizontal tab and a vertical tab.

16. The article of eyewear of claim 12, wherein the mounting portion of each of the temples includes a medial window disposed to be adjacent the hook when the hook is engaged with the mounting portion.

17. An article of eyewear, comprising:
   a frameless, rigid lens configured to cover both eyes of a wearer when worn, the lens having a generally cylindrical curvature in a side-to-side direction, such that lateral ends of the lens are rearward of a central nose bridge; and a pair of temples, each temple including a mounting portion configured to releasably mate with the lens and a temple arm pivotably coupled to the mounting portion;

wherein the lens has an S-shaped cross section at the central nose bridge and a C-shaped cross section at a position between the central nose bridge and one of the lateral ends.

18. The article of eyewear of claim 17, wherein the lens includes a pair of mounting areas, each of which includes a hook portion configured to mate with the mounting portion of a corresponding one of the temples.

19. An article of eyewear, comprising:

a frameless, rigid lens configured to cover both eyes of a wearer when worn, the lens having a generally cylindrical curvature in a side-to-side direction, such that lateral ends of the lens are rearward of a central nose bridge; and a pair of temples, each temple including a mounting portion configured to releasably mate with the lens and a temple arm pivotably coupled to the mounting portion;

wherein the mounting portion of each temple has a recess configured to receive a hook portion of the lens; and wherein the mounting portion further includes a medial window adjacent the recess, wherein the window is configured to provide space for the hook portion to be selectively dislodged by a user.

20. An article of eyewear, comprising:

a frameless, rigid lens configured to cover both eyes of a wearer when worn, the lens having a generally cylindrical curvature in a side-to-side direction, such that lateral ends of the lens are rearward of a central nose bridge; and a pair of temples, each temple including a mounting portion configured to releasably mate with the lens and a temple arm pivotably coupled to the mounting portion;

wherein the lens includes a pair of mounting areas, each of which includes a hook portion configured to mate with the mounting portion of a corresponding one of the temples; and wherein the mounting area further comprises one or more tabs configured to mate with corresponding recesses or channels in the mounting portion of the temple.

* * * * *